United States Patent
Yang et al.

(10) Patent No.: US 11,991,742 B2
(45) Date of Patent: May 21, 2024

(54) UU AND SIDELINK PRIORITIZATION FOR SUBBAND FULL DUPLEX UES

(71) Applicant: QUALCOMM Incorporated, San Diego, CA (US)

(72) Inventors: Wei Yang, San Diego, CA (US); Seyedkianoush Hosseini, San Diego, CA (US); Muhammad Sayed Khairy Abdelghaffar, San Jose, CA (US); Ahmed Attia Abotabl, San Diego, CA (US); Abdelrahman Mohamed Ahmed Mohamed Ibrahim, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/341,337

(22) Filed: Jun. 7, 2021

(65) Prior Publication Data
US 2022/0394728 A1 Dec. 8, 2022

(51) Int. Cl.
*H04L 5/14* (2006.01)
*H04W 72/0453* (2023.01)
*H04W 72/1263* (2023.01)
*H04W 72/566* (2023.01)
*H04W 92/18* (2009.01)

(52) U.S. Cl.
CPC ............ *H04W 72/569* (2023.01); *H04L 5/14* (2013.01); *H04W 72/0453* (2013.01); *H04W 72/1263* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2012/0063373 A1* | 3/2012 | Chincholi | H04L 5/0064 370/281 |
| 2018/0007667 A1* | 1/2018 | You | H04W 88/08 |
| 2019/0028260 A1* | 1/2019 | Karlsson | H04L 5/1423 |
| 2019/0089502 A1* | 3/2019 | Yi | H04W 72/0453 |

(Continued)

FOREIGN PATENT DOCUMENTS

| | | |
|---|---|---|
| WO | 2017121487 A1 | 7/2017 |
| WO | 2021021892 A1 | 2/2021 |

OTHER PUBLICATIONS

International Search Report and Written Opinion—PCT/US2022/031973—ISA/EPO—dated Sep. 9, 2022.

(Continued)

*Primary Examiner* — Jenkey Van
(74) *Attorney, Agent, or Firm* — Procopio, Cory, Hargreaves & Savitch LLP

(57) ABSTRACT

An apparatus and method for Uu and sidelink prioritization for subband full duplex UEs. The apparatus determines a priority level associated with channels that are scheduled to collide with each other. The apparatus transmits or receives a channel having a highest priority between the channels that are scheduled to collide with each other. The channel comprises at least one of an UL transmission, a DL reception, an SL transmission, or an SL reception. The apparatus enables simultaneous reception or transmission of the channel using a FD operation based on at least one condition.

29 Claims, 16 Drawing Sheets

(56) References Cited

U.S. PATENT DOCUMENTS

| | | | |
|---|---|---|---|
| 2019/0199504 A1* | 6/2019 | Abedini | H04L 5/0023 |
| 2019/0364449 A1* | 11/2019 | Yang | H04W 72/04 |
| 2020/0205165 A1 | 6/2020 | Huang et al. | |
| 2020/0336249 A1* | 10/2020 | Yi | H04W 72/1263 |
| 2021/0067308 A1* | 3/2021 | Ly | H04L 5/0051 |
| 2021/0352643 A1* | 11/2021 | Ahn | H04W 72/0446 |
| 2021/0368459 A1* | 11/2021 | Zhang | H04L 5/0048 |
| 2022/0006603 A1* | 1/2022 | Lei | H04W 80/02 |
| 2022/0256583 A1* | 8/2022 | Wang | H04W 72/23 |
| 2022/0279537 A1* | 9/2022 | Freda | H04W 72/1284 |
| 2022/0393847 A1* | 12/2022 | Moon | H04L 5/14 |
| 2023/0309126 A1* | 9/2023 | Suh | H04L 5/0053 |

OTHER PUBLICATIONS

LG Electronics: "Coexistence Issues of WAN and D2D on Multiple Carriers", R1-142153, 3GPP TSG RAN WG1 Meeting#77, 3rd Generation Partnership Project (3GPP), Mobile Competence Centre, 650, Route Des Lucioles, F-06921 Sophia-Antipolis Cedex, France, vol. RAN WG1, No. Seoul, Korea, May 19, 2014-May 23, 2014, May 18, 2014, XP050789273, 4 Pages, Page 2, first paragraph, and Proposal 1. Section 2.2, paragraphs 1 and 2.

LG Electronics: "Multiplexing Issues of WAN and D2D", R1-142152, 3GPP TSG RAN WG1 Meeting #77, 3rd Generation Partnership Project (3GPP), Mobile Competence Centre, 650, Route Des Lucioles, F-06921 Sophia-Antipolis Cedex, France, vol. RAN WG1, No. Seoul, Korea, May 19, 2014-May 23, 2014, May 18, 2014, XP050789272, 3 Pages, Section 3.2.

* cited by examiner

| Uu Priority Index |
|---|
| 1 |
| 0 |

510

| SL Priority Index |
|---|
| 1 |
| 2 |
| 3 |
| 4 |
| 5 |
| 6 |
| 7 |
| 8 |

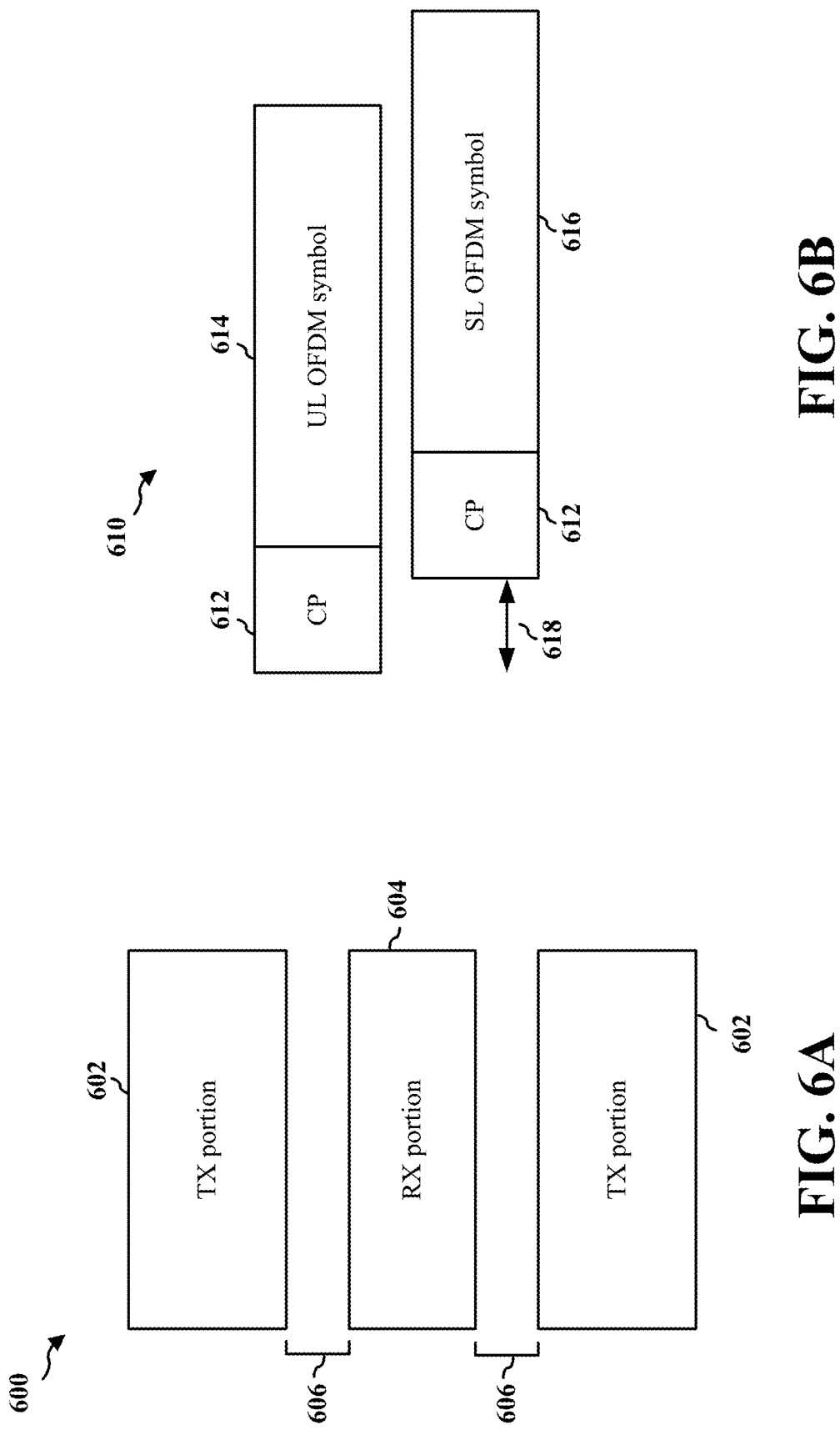

UU AND SIDELINK PRIORITIZATION FOR SUBBAND FULL DUPLEX UES

TECHNICAL FIELD

The present disclosure relates generally to communication systems, and more particularly, to a configuration for Uu and sidelink prioritization for subband full duplex UEs.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus may determine a priority level associated with channels that are scheduled to collide with each other. The apparatus may transmit or receive a channel having a highest priority between the channels that are scheduled to collide with each other. The channel comprises at least one of an uplink (UL) transmission, a downlink (DL) reception, a sidelink (SL) transmission, or an SL reception. The apparatus may enable simultaneous reception or transmission of the channel using a full duplex (FD) operation based on at least one condition.

In an aspect of the disclosure, a method, a computer-readable medium, and an apparatus are provided. The apparatus may be a device at a base station. The device may be a processor and/or a modem at a base station or the base station itself. The apparatus may transmit, to a user equipment (UE), a schedule for the UE to transmit or receive channels. At least two channels are scheduled to collide with each other. The apparatus may transmit or receive a channel having a highest priority between the channels that are scheduled to collide with each other based on a prioritization procedure performed at the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an example of a priority index for sidelink and Uu communications.

FIG. 6A is a diagram illustrating an example of transmission and reception portions for simultaneous SL/Uu operation.

FIG. 6B is a diagram illustrating an example of a timing condition for simultaneous SL/Uu operation.

DETAILED DESCRIPTION

Figure 1:
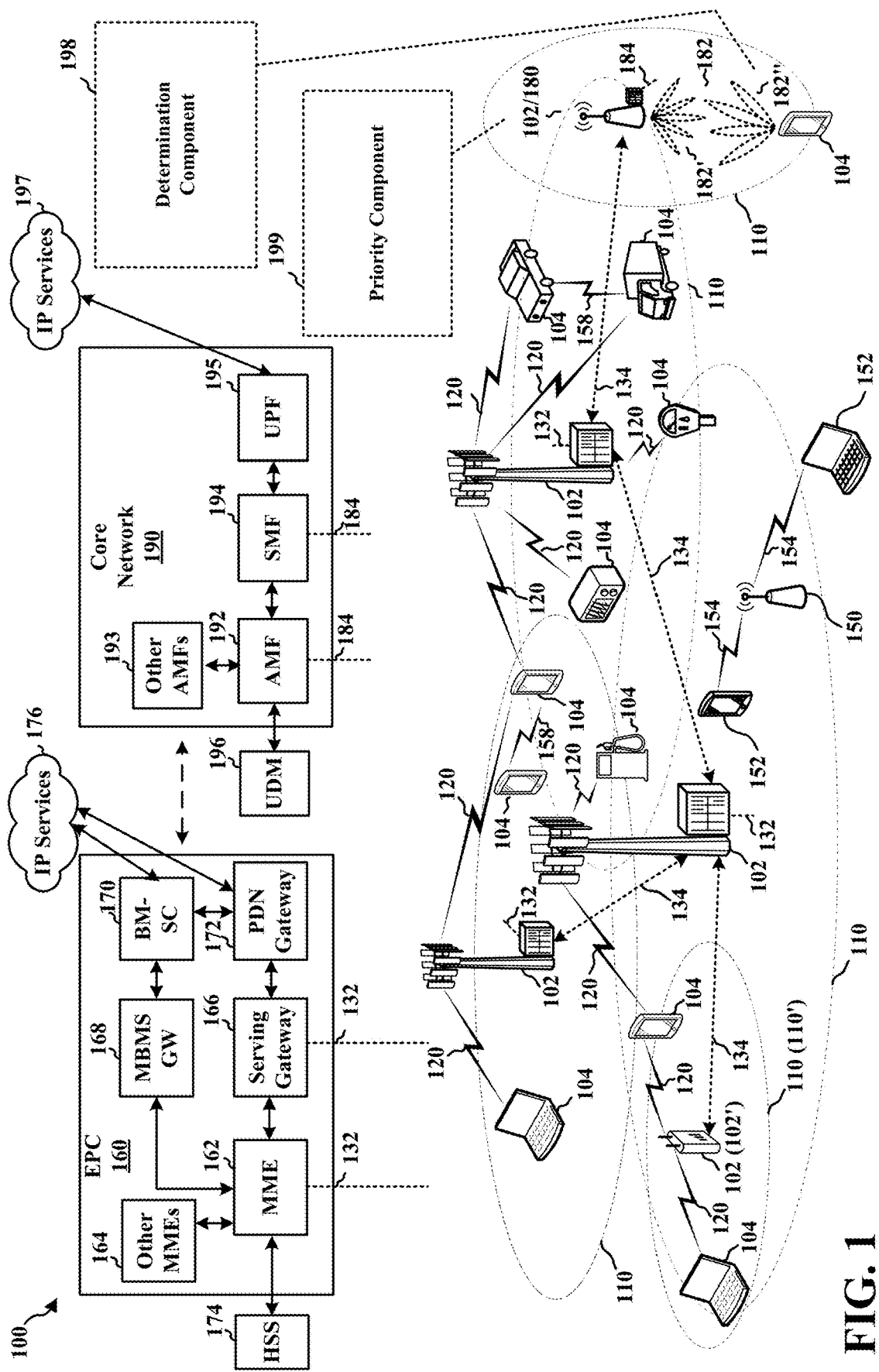
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to determine a priority level between SL and Uu channels. For example, the UE 104 may comprise a determination component 198 configured to determine a priority level between SL and Uu channels. The UE 104 may determine a priority level associated with channels that are scheduled to collide with each other. The UE 104 may transmit or receive a channel having a highest priority between the channels that are scheduled to collide with each other, wherein the channel comprises at least one of a UL transmission, a DL reception, an SL transmission, or an SL reception. The UE 104 may enable simultaneous reception or transmission of the channel using a full duplex operation based on at least one condition.

Referring again to FIG. 1, in certain aspects, the base station 180 may be configured to transmit or receive a signal from a UE based on a prioritization procedure performed by the UE between SL and Uu channels. For example, the base station 180 may comprise a priority component 199 configured to transmit or receive a signal from the UE based on the prioritization procedure performed by the UE between SL and Uu channels. The base station 180 may transmit, to the UE 104, a schedule for the UE to transmit or receive channels, wherein at least two channels are scheduled to collide with each other. The base station 180 may transmit or receive a channel having a highest priority between the channels that are scheduled to collide with each other based on a prioritization procedure performed at the UE.

Although the following description may be focused on 5G NR, the concepts described herein may be applicable to other similar areas, such as LTE, LTE-A, CDMA, GSM, and other wireless technologies.

Figure 2:
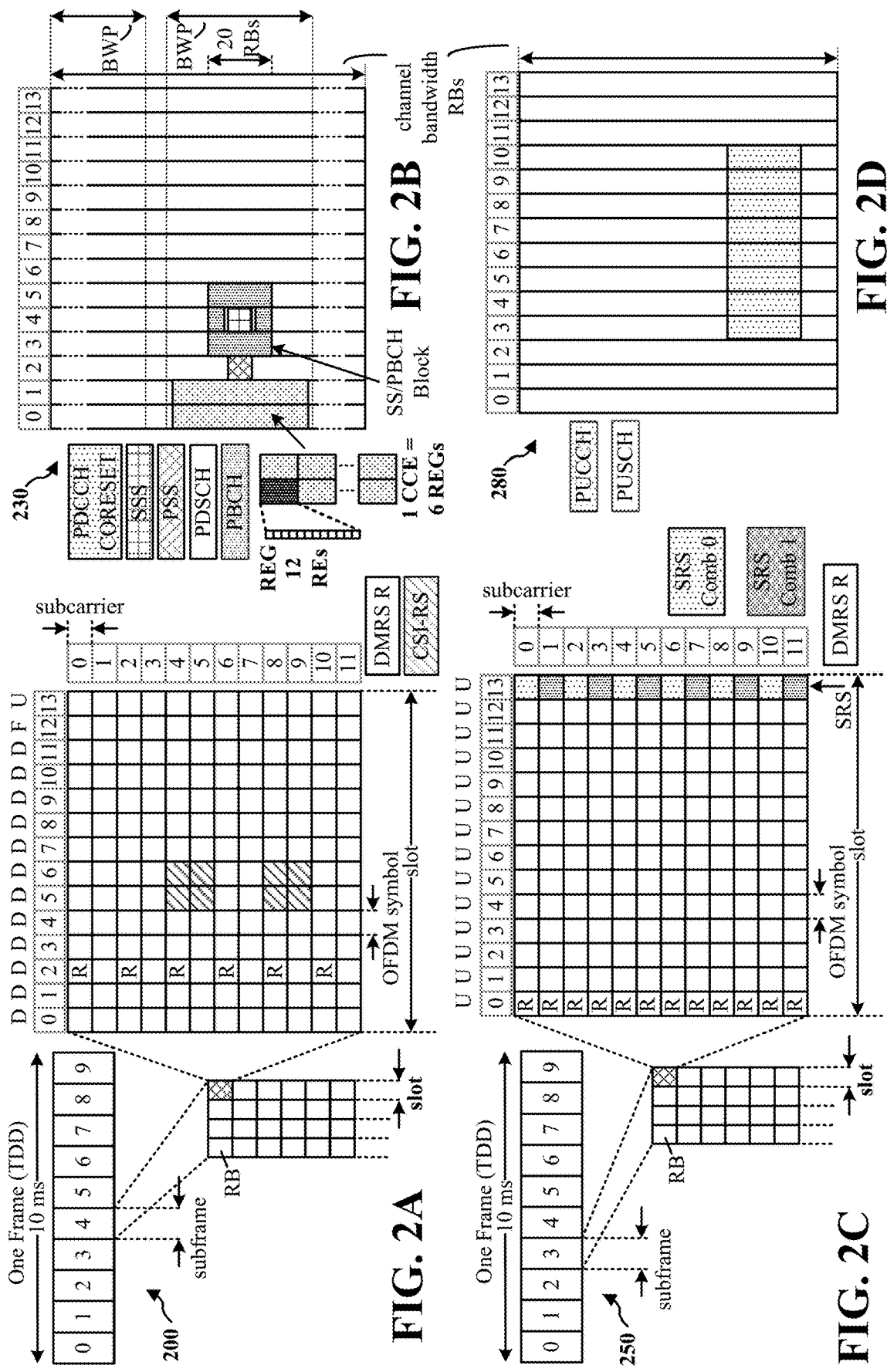
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ t slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
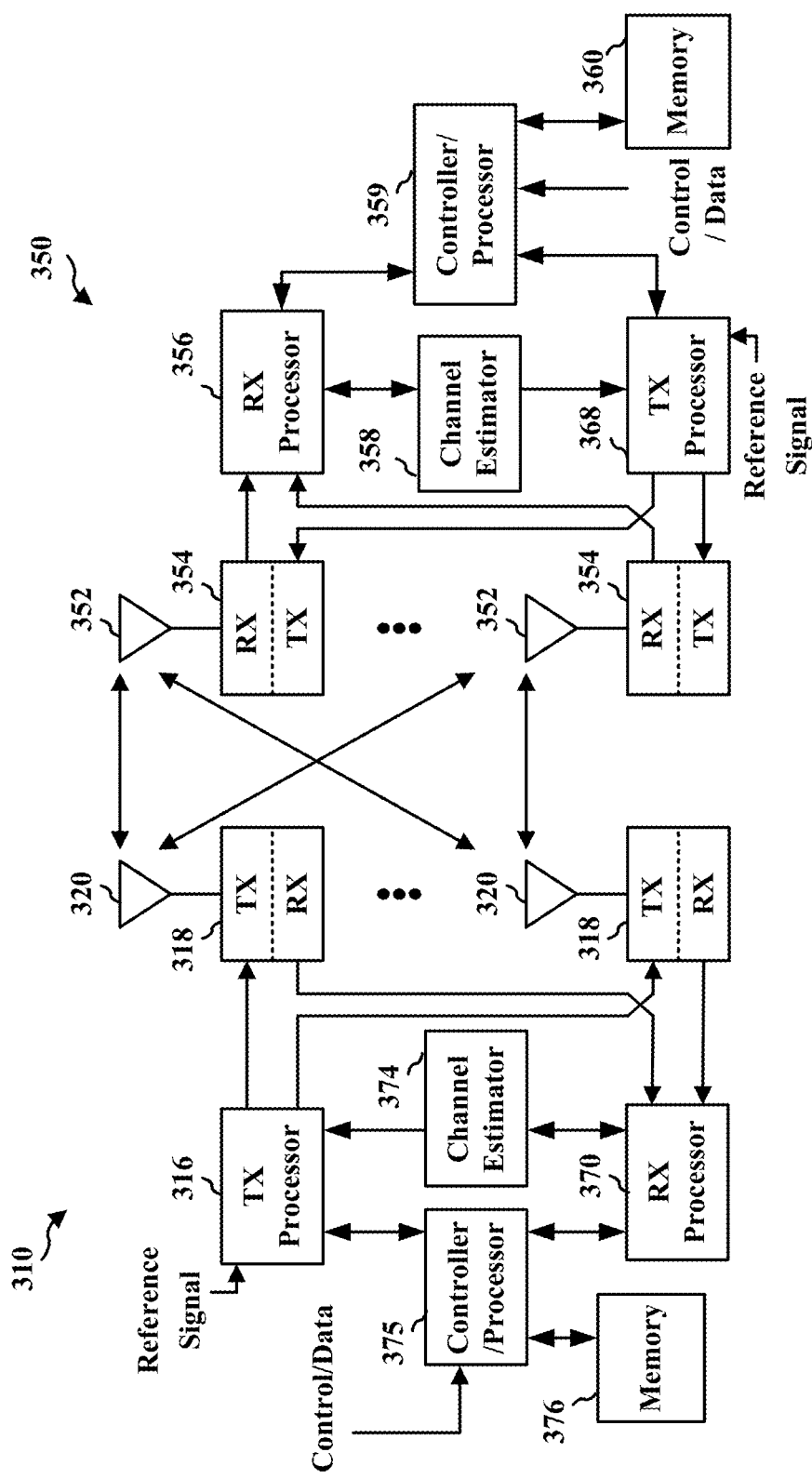
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
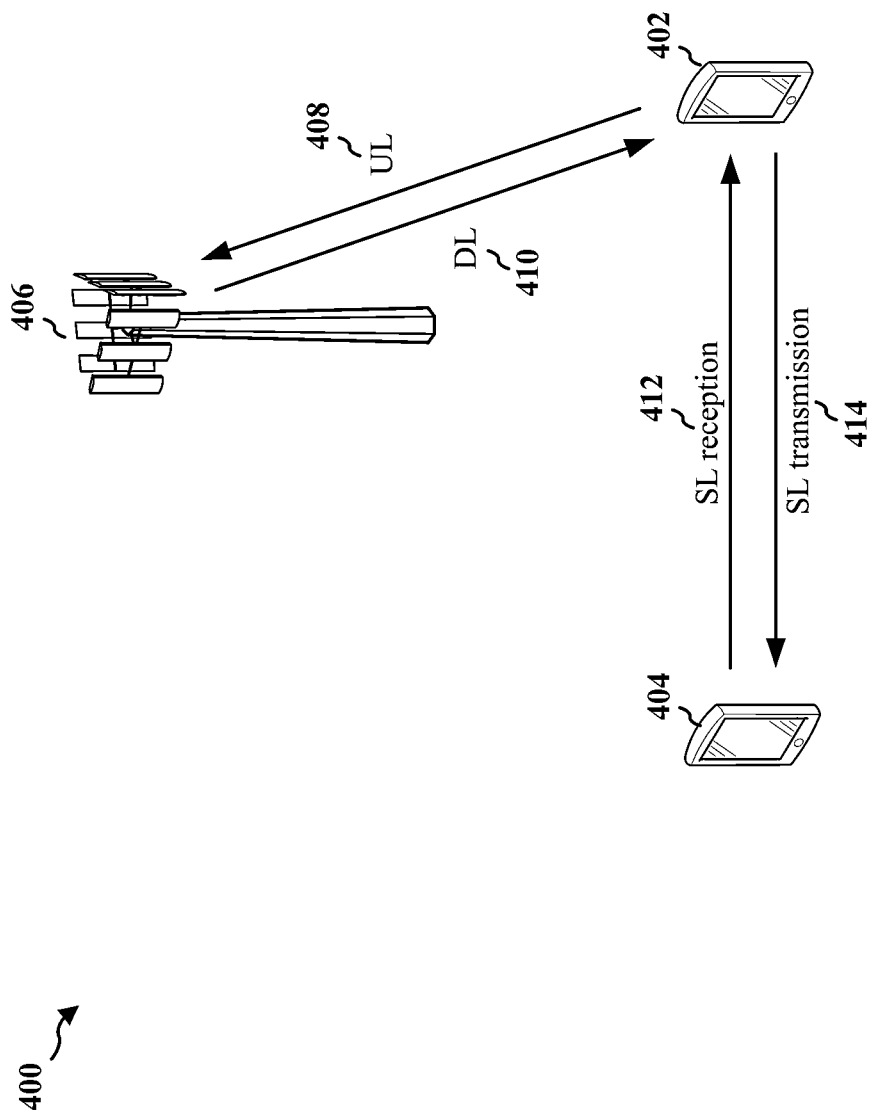
FIG. 4 is a diagram illustrating an example of a UE communicating with a base station and another UE.

In wireless communications, a UE may be configured to communicate with a base station by transmitting uplink (UL) signals or receiving downlink (DL) signals. The UE may also be configured to communicate with another UE via sidelink (SL). For example, with reference to the diagram 400 of FIG. 4, a first UE 402 may communicate with the base station 406 by transmitting uplink 408 or receiving downlink 410. The first UE 402 may communicate with a second UE 404 via sidelink by receiving a sidelink reception 412 or by transmitting a sidelink transmission 414.

A half duplex UE cannot transmit and receive at the same time. As such, whenever a SL reception collides with an SL or Uu transmission, the UE needs to perform a prioritization procedure between the reception and transmission to determine which channel has priority and is thus received or transmitted. An SL transmission do not collide with Uu reception due to SL communications occurring on an UL cell/slot.

Each SL transmission/reception (e.g., PSCCH, PSSCH, physical sidelink feedback channel (PSFCH), sidelink synchronization signal (S-SS), PSBCH) is associated with a priority value from 1 to 8, with the value 1 being the highest priority, as shown for example in diagram 500 of FIG. 5. The priority of some SL channels (e.g., PSCCH, PSSCH, or PSFCH) may be determined based on the contents of its data (e.g., logical channel). In some instances, the priority of S-SS or PSBCH block transmission or reception may be configured by the network (e.g., sl-SSB-PriorityNR). On Uu, each UL transmission may be associated with a priority index of 0 or 1, where the priority index of 1 being high priority and priority index 0 being low priority, as shown for example in diagram 510 of FIG. 5. UL transmissions may comprise PUCCH, PUSCH, SRS, or physical random access channel (PRACH). SRS is a low priority and has a priority index of 0. A PRACH transmission or a PUSCH scheduled by an UL grant in a random access response (RAR) and its retransmission, or a PUSCH for a random access procedure and its retransmission have a higher priority than a SL transmission or reception. A SL HARQ-ACK on PUCCH may have the same priority as the corresponding SL HARQ-ACK on PSFCH.

A UE may be configured with one or two priority thresholds in order for the UE to determine the prioritization between UL transmissions and SL transmissions/receptions. For example, the UE may be configured with the priority thresholds sl-PriorityThresholdULURLLC and sl-PriorityThreshold. In some instances, an SL transmission/reception with a priority value less than sl-PriorityThresholdULURLLC may have a higher priority than an UL transmission with a priority index of 1 (e.g., URLLC transmissions). In some instances, an SL transmission/reception with a priority value between sl-PriorityThresholdULURLLC and sl-PriorityThreshold may have a priority that is lower than a UL transmission with a priority index of 1, but may have a higher priority than a UL transmission with a priority index of 0 (e.g., enhanced mobile broadband (eMMB) transmission). In some instances, an SL transmission/reception with a priority value that is not less than sl-PriorityThreshold may have a priority that is lower than an UL transmission having a priority index of 0. The UE may be configured to first resolve any collisions between all the UL channels, and then resolve any collisions amongst SL and UL channels. The UE does not need to determine a priority between SL SSB and SL PSSCH, PSCCH, or PSFCH or between PSSCH, PSCCH and PSFCH since such communications occur on different resources. The UE may not need to determine a priority between PSSCH, PSCCH transmission and PSSCH, PSCCH reception due to a SL UE not knowing whether or when it may receive an SL transmission.

For a subband full duplex (SBFD) UE, in instances where the UE is scheduled to transmit a first number of SL/Uu-UL channels and receive a second number of Uu-DL/SL S-SS, PSBCH, or PSFCH, the UE may drop all the transmission or all the receptions in response to determining which channel has the highest priority, which may be inefficient, especially for a UE configured to operate in a full duplex configuration.

The present disclosure relates to a configuration for Uu and SL prioritization to take advantage of full duplex capabilities of such UEs. The present disclosure may provide a configuration to allow UEs to determine what channels to transmit and/or receive, and which channels to drop. Additionally, the configuration may provide a set of conditions or constraints, imposed by the UE, that may be satisfied in order for the UE to enable simultaneous reception and transmission.

In some instances, to enable full duplex operation over Uu and SL, the UE may impose some conditions or constraints that may be satisfied in order to enable simultaneous reception and transmission. At least one of the conditions/constraints may be satisfied in order to enable simultaneous reception and transmission. For example, a first condition may include that the UE may not transmit and receive on a same RB. Another condition, for example as shown in diagram 600 of FIG. 6A, may include that a gap 606 may be present between a receive (RX) portion 604 and a transmission (TX) portion 602. A gap 606 may be present between each TX portion 602 and RX portion 604. In some instances, a size of the gap may be a configured value or based on UE capability. In some instances, the size of the gap may be based on the bandwidth of the transmission portion 602. Another condition may comprise that the number of TX/RX switches may be limited. For example, there may be at most K TX to RX or RX to TX switches in the frequency domain, where K may be 1 or 2. Another condition may comprise that the UE may not transmit two channels at the same time. For example, if the two transmissions are in the same carrier, or if the UE is not capable of simultaneous SL/Uu transmissions. Another condition may be related to timing constraints between transmissions and receptions. The timing difference between TX and RX, or between TX and TX, or between RX and RX may be limited to a certain threshold $\delta_T$. In some instances, the threshold $\delta_T$ may be based on a cyclic prefix (CP). For example, threshold $\delta_T$=CP, or threshold $\delta_T$=CP/2. For example, with reference to diagram 610 of FIG. 6B, the timing difference 618 between SL OFDM symbol 616 and UL OFDM symbol 614 should be less than the threshold $\delta_T$. In some instances, the threshold $\delta_T$ may be equal to the CP 612. As such, if the timing difference is greater than the threshold $\delta_T$, then the UE may not simultaneous transmit or receive. Another condition may include that a transmission power spectral density should be limited. For example, if the UE is capable of transmitting two channels, then the total transmit power of the two channels should not exceed the power spectral density. In some aspects, if the UE is performing simultaneous reception, the PSD of the transmission portion may be below a threshold. In some aspects, the PSD limit of the transmission portion may be a function of how far away, in frequency, the transmission is from the reception portion. For example, the PSD limit may be a first number if the transmission portion is close to the reception portion, and may be a second number if the transmission portion is far from the reception portion, wherein the first number is less than the second number. In some aspects, the PSD limit on the transmission portion may be invoked if the priority of the reception signal is higher than the priority of the transmission signal.

The UE may be configured to determine a priority of SL/Uu transmissions and receptions. In instances where a SL UE is scheduled to transmit a first number of UL/SL channels and receive a second number of PSFCHs, S-SS, or PSBCH, the UE may perform a prioritization procedure to determine a subset of Uu/SL channels to transmit and/or receive. For example, the UE may resolve any conflicts or overlapping between UL transmissions. Resolving conflicts or overlapping between UL transmissions may result in one or more UL channels that may be transmitted simultaneously by the UE. The UE may then order all the UL/SL channels based on the priority from high priority to low priority. The priority of Uu-UL/SL channels, discussed above and in connection with FIG. 5, may be utilized to cover the priority of Uu DL channels. For example, two priority indices (e.g., sl-PriorityThresholdULURLLC and sl-PriorityThreshold) for Uu DL transmissions, similar to that of UL may be utilized. The same priority thresholds sl-PriorityThresholdULURLLC and sl-PriorityThreshold may be utilized to compare DL and SL priorities. In the event of a tie, the UE may order the TX channels or RX channels in consecutive indices. The UE may generate a set of channels S that may be transmitted or received by the UE after the prioritization procedure. The set of channels S may be initialized as an empty set. The UE may add channels to the set of channels S, one by one, if at least one of the following conditions is fulfilled. The UE may start from the channel with the highest priority to the lowest priority and determine whether an i-th channel may be transmitted or received. For example, if the i-th channel conflicts with any of the channels in the set of channels S (e.g., if a channel j is within the set S such that the one or more conditions/constraints, discussed above, is not satisfied for the i-th channel and channel j), then the i-th channel is dropped. If the i-th channel does not conflict with any of the channels in the set S, then the i-th channel may be added to the set S. In some aspects, if the i-th channel is a transmission channel, the power of the i-th channel may be set to limit interference to any receiving channels within the set S. Any channel j that is within the set S has a priority that is higher than the channel i. The procedure may result in a set of channels that may be transmitted/received simultaneously by the UE.

Figures 7A, 7B:
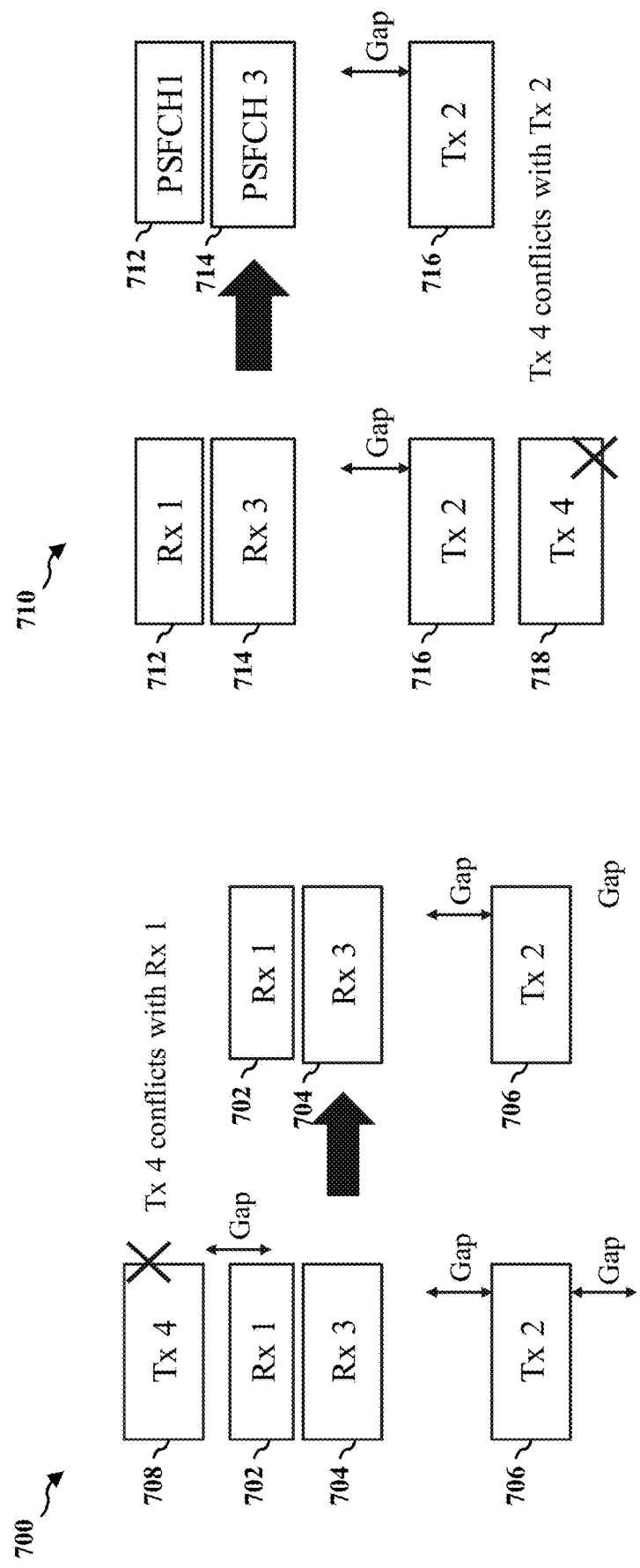
FIG. 7A is a diagram illustrating an example of a prioritization procedure.
FIG. 7B is a diagram illustrating an example of a prioritization procedure.

The channel i may be determined to conflict with any of the channels within the set S, if the channel i and any channel j in the set S are in different directions (e.g., one is TX and the other is RX), and the two channels are either overlapping in frequency or are not separated by a gap in frequency. For example, with reference to diagram 700 of FIG. 7A, the set S may include RX1 702, RX3 704, and TX2 706. RX1 702 has the highest priority and may be received. TX4 708 may conflict with RX1 702 because TX4 708 and RX1 702 are overlapping in frequency and the gap separation is not sufficient. As such TX4 708 conflicts with RX1 702 and is dropped.

In some instances, the channel i conflicts with a channel in set S if the channel i is a transmission (e.g., UL transmission or SL transmission) and the set S comprises one or more transmissions, such that the UE may not transmit the channel i and the existing channels in set S at the same time. For example, with reference to diagram 710 of FIG. 7B, the set S may comprise RX1 712, RX3 714, and TX2 716. The channel TX4 718 conflicts with TX2 716, such that the UE may not transmit two transmission channels at the same time. The UE then determines which has the higher priority to determine which to transmit. In such instance, TX2 716 has a higher priority (e.g., due to having a priority index of 2) than TX4 718, such that TX4 718 is dropped and the UE transmits TX2 716.

Figure 8B:
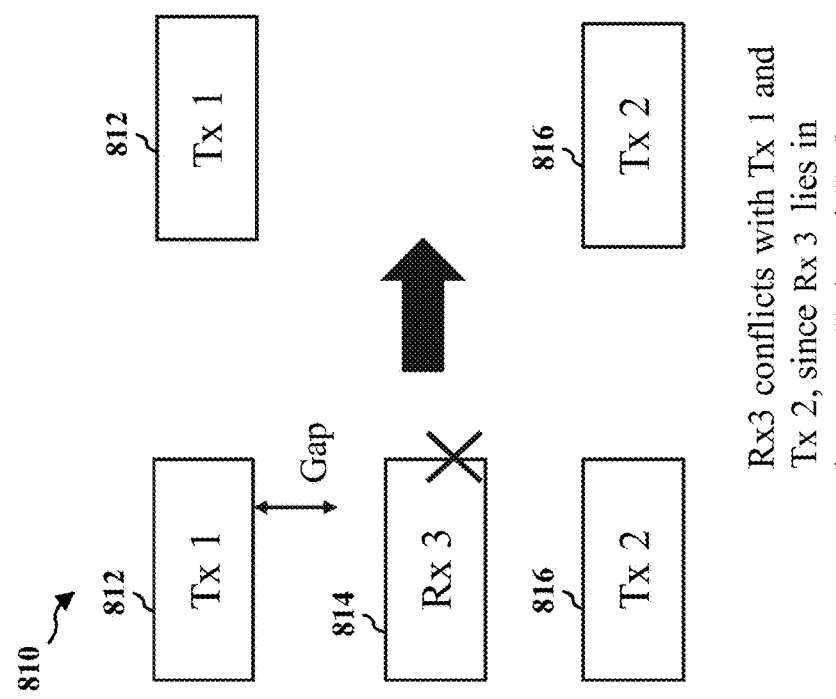
FIG. 8B is a diagram illustrating an example of a prioritization procedure.

In some instances, the channel i conflicts with a channel in set S if the channel i is a transmission and the set S comprises a transmission channel j and a reception channel k, such that reception channel k is in between the transmission channel i and transmission channel j. In some instances, the channel i conflicts with a channel in set S if the channel i is a reception and the set S includes two transmissions channels j and k such that the reception channel i is in between the transmission channel j and k. For example, with reference to diagram 810 of FIG. 8B, the set S may comprise TX1 812 and TX2 816, and the addition of RX3 814 would be in between TX1 812 and TX2 816, such that RX3 814 conflicts with TX1 812 and TX2 816 and is dropped.

Figure 8A:
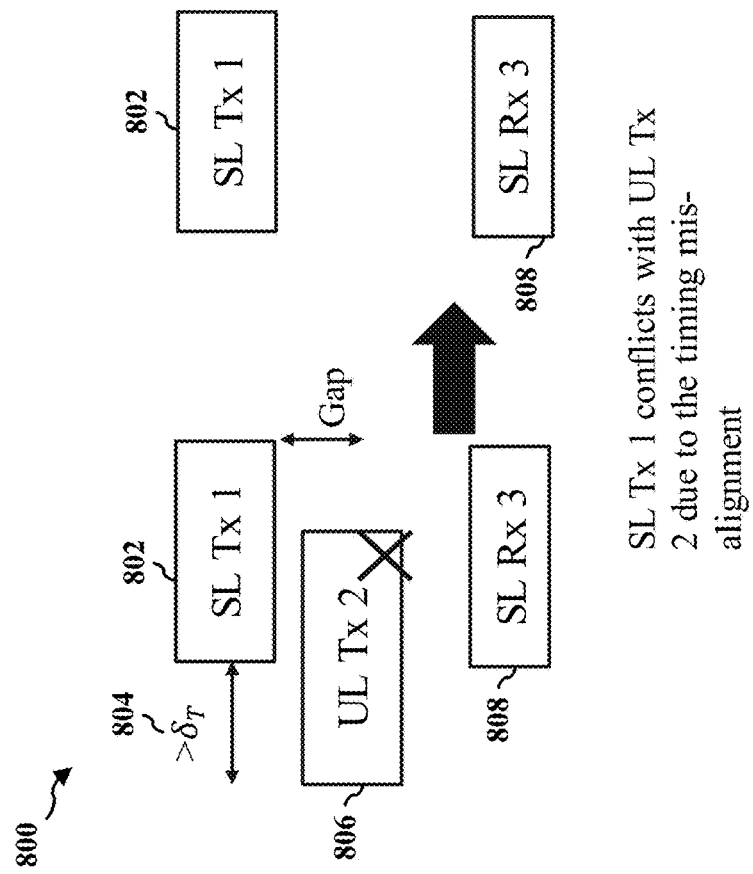
FIG. 8A is a diagram illustrating an example of a prioritization procedure.

In some instances, the channel i conflicts with a channel in set S if the channel i is an UL transmission (or SL reception/transmission) and channel j in set S is a SL transmission/reception (or UL transmission), and due to timing differences, the gap between the starting time of channel i and channel j is greater than the threshold $\delta_T$. For example, with reference to diagram 800 of FIG. 8A, the set S may comprise SL TX1 802 and SL RX3 808. The UL TX2 806 may conflict with at least SL TX1 802 because the start time different between UL TX2 806 and SL TX1 802 is greater than the threshold $\delta_T$ 804. As such, UL TX2 806 conflicts with SL TX1 802 and is dropped.

In some instances, the channel i conflicts with a channel in set S if the addition of channel i to set S would result in a number of TX/RX switches for set S that is greater than the number of TX/RX switches supported by the UE.

Figure 9:
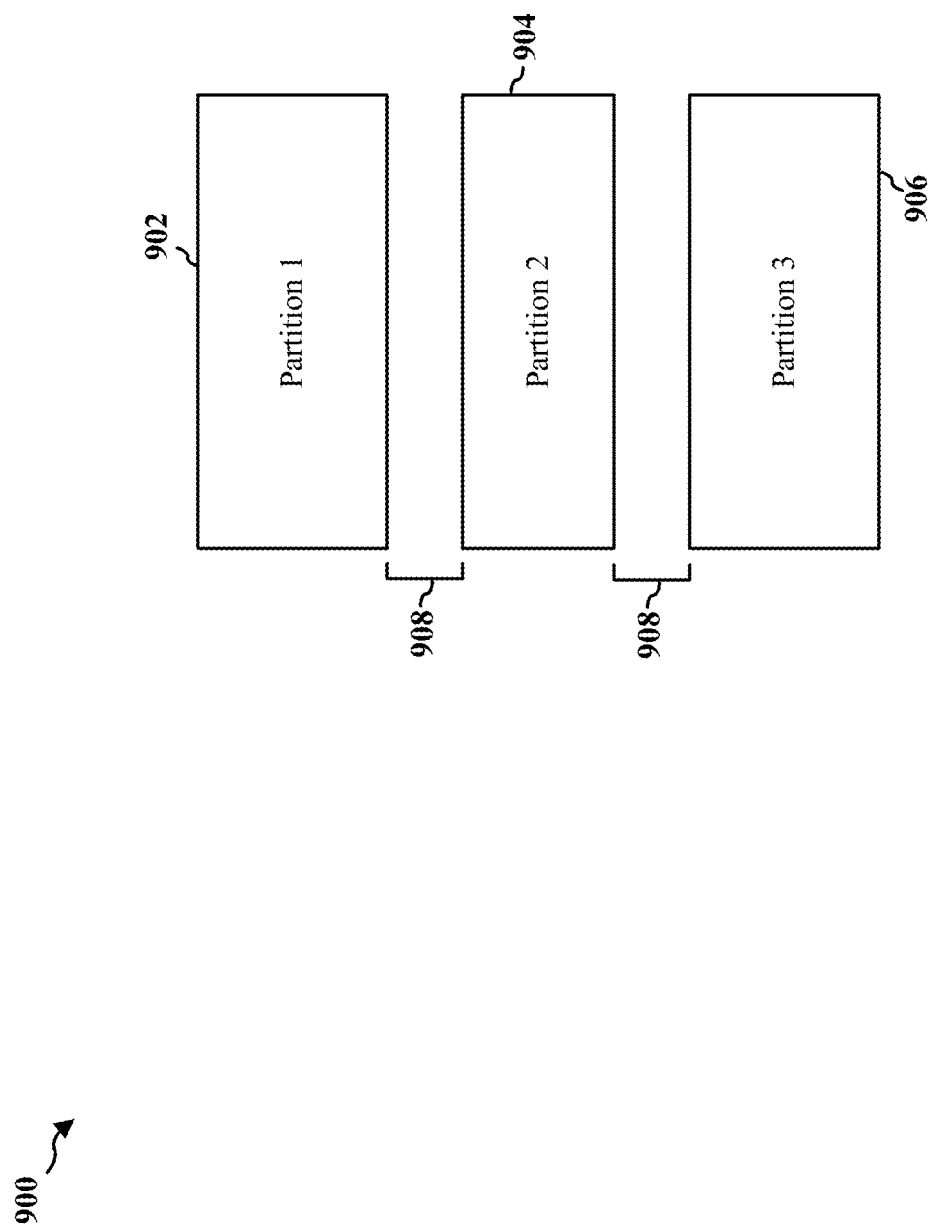
FIG. 9 is a diagram illustrating an example of transmission or reception partitions.
Figure 10A:
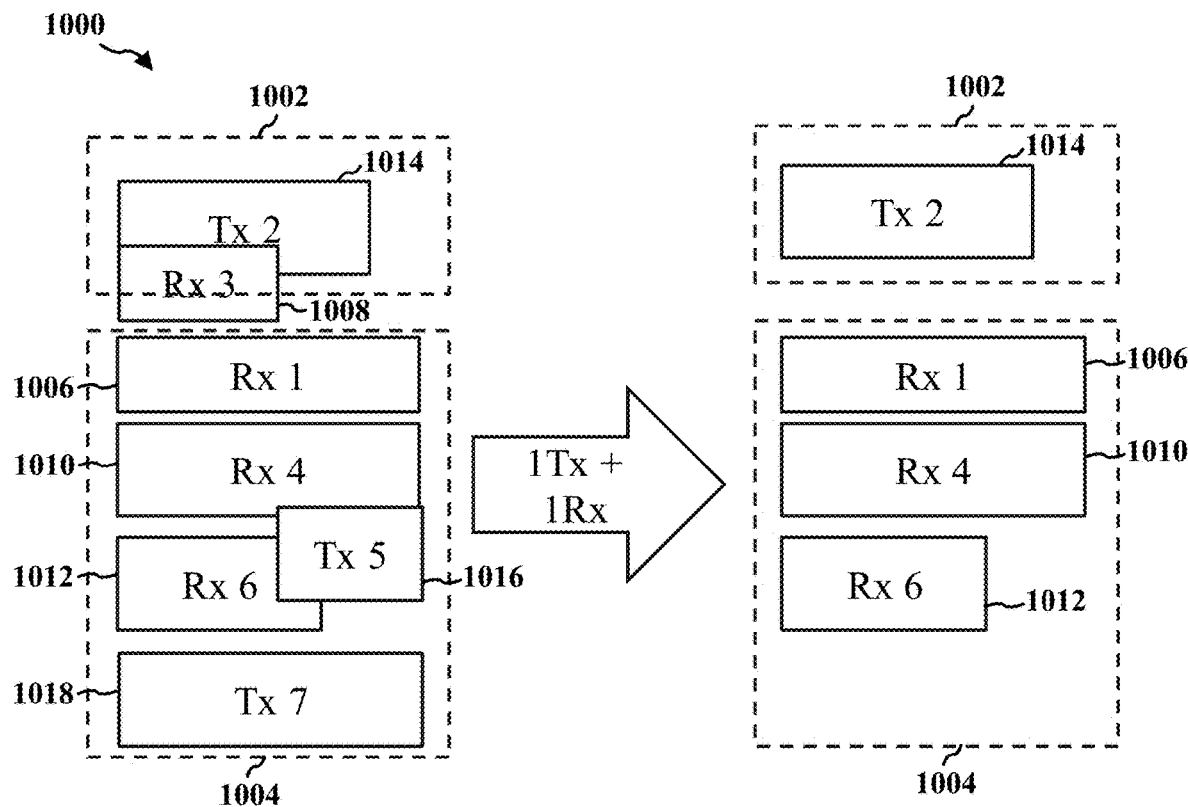
FIG. 10A is a diagram illustrating an example of a prioritization procedure.

In some instances, the UE may partition the resources, including both Uu and SL, into two or more parts, with a gap in between each of the partitioned parts. The UE may perform a prioritization within each partition. For example, a communication direction may be determined for each partition based on the corresponding channels that are scheduled in each partition. In some aspects, the UE may pre-assign a communication direction for each partition independent of the channels that may be scheduled in each partition. The UE may transmit or receive corresponding channels if the channel corresponds with the pre-assigned communication direction. In some instances, if a channel is within or overlaps the gap, and does not have the highest priority, the channel is dropped. If the channel that is within the gap has the highest priority, then such channel has priority and the UE will drop the remaining channels that have an opposite communication direction. The UE may determine the channels to transmit and/or receive within each partitioned parts separately. For example, with reference to diagram 900 of FIG. 9, the resources may be partitioned to comprise a partition1 902, a partition2 904, and a partition3 906. A gap 908 may be between partition1 902 and partition2 904, and a gap 908 may be between partition2 904 and partition3 906. In some instances, there is no full duplex operation within each partition, there may be one communication direction in each respective partition from the perspective of the UE. Full duplex operation (e.g., simultaneous TX and RX) may be allowed across different partitions. In some aspects, the communication direction in each partition may be configurable based on the priority. For example, with reference to diagram 1000 of FIG. 10A, the resources may comprise a first partition 1002 and a second partition 1004. The first partition 1002 may comprise TX2 1014 and RX3 1008. The UE may perform a prioritization procedure for the first partition 1002. TX2 1014 has a higher priority index (e.g., priority index 2), than RX3 1008 (e.g., priority index 3), such that TX2 1014 has priority within the first partition 1002, such that the communication direction of the first partition 1002 corresponds to that of TX2 1014. As such, the first partition 1002 is configured to transmit channels, such that RX3 1008 conflicts and is dropped. The UE may also perform the prioritization procedure for the second partition 1004. The second partition may comprise RX1 1006, RX4 1010, TX5 1016, RX6 1012, and TX7 1018. RX1 1006 has the highest priority index (e.g., priority index 1) within the second partition 1004, such that RX1 1006 has priority within the second partition 1004, such that the communication direction of the second partition 1004 corresponds to that of RX1 1006. As such, the second partition 1004 is configured to receive channels, such that TX5 1016 and TX7 1018 conflict and are dropped.

Figure 10B:
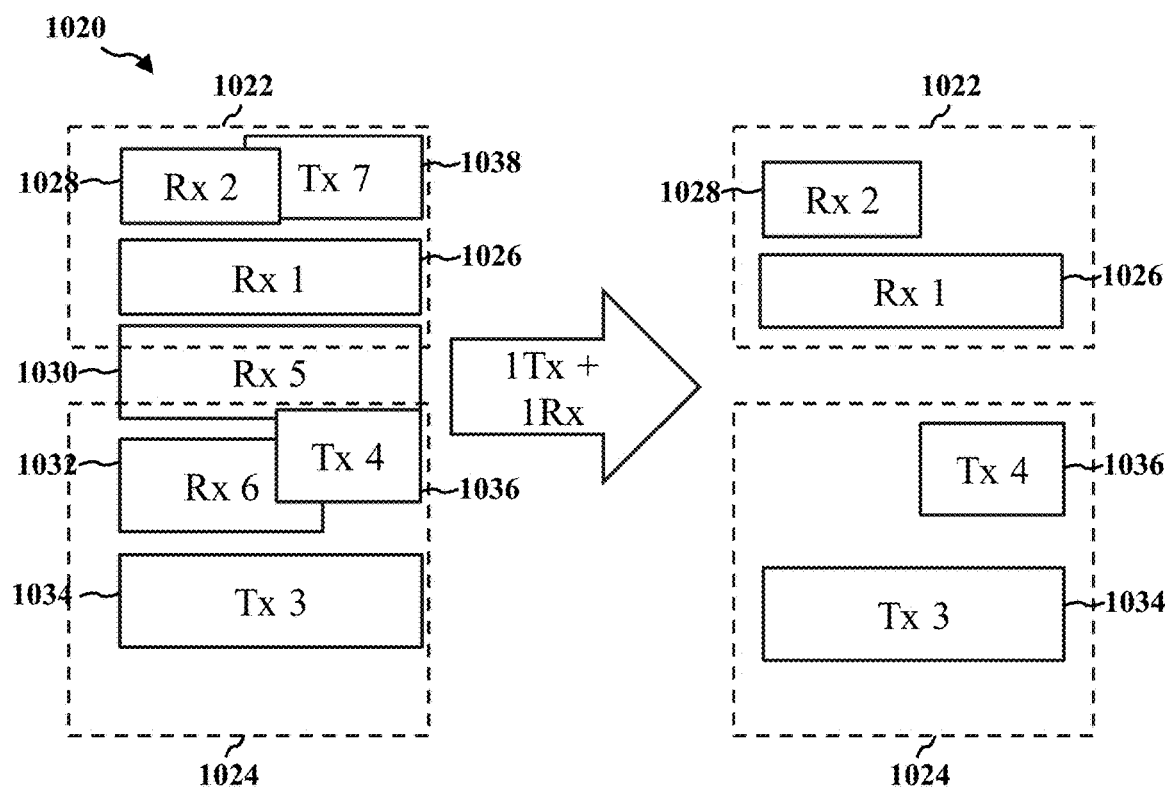
FIG. 10B is a diagram illustrating an example of a prioritization procedure.

In another example, as shown in diagram 1020 of FIG. 10B, the resources may comprise a first partition 1022 and a second partition 1024. The first partition 1022 may comprise RX1 1026, RX2 1028, RX5 1030, and TX7 1038. RX1 1026 has the highest priority index within the first partition 1022, such that RX1 1026 has priority within the first partition 1022, such that the communication direction of the first partition 1022 corresponds to that of RX1 1026. As such, the first partition 1022 is configured to receive channels, such that TX7 1038 conflicts and is dropped. RX5 1030 is also dropped because RX5 1030 is within the gap resource and is not the highest priority within the partition. The second partition 1024 may comprise TX3 1034, TX4 1036, RX5 1030, and RX6 1032. TX3 1034 has the highest priority index within the second partition 1024, such that TX3 1034 has priority within the second partition 1024, such that the communication direction of the second partition 1024 corresponds to that of TX3 1034. As such, the second partition 1024 is configured to transmit channels, such that RX5 1030 and RX6 1032 are dropped.

Figure 11:
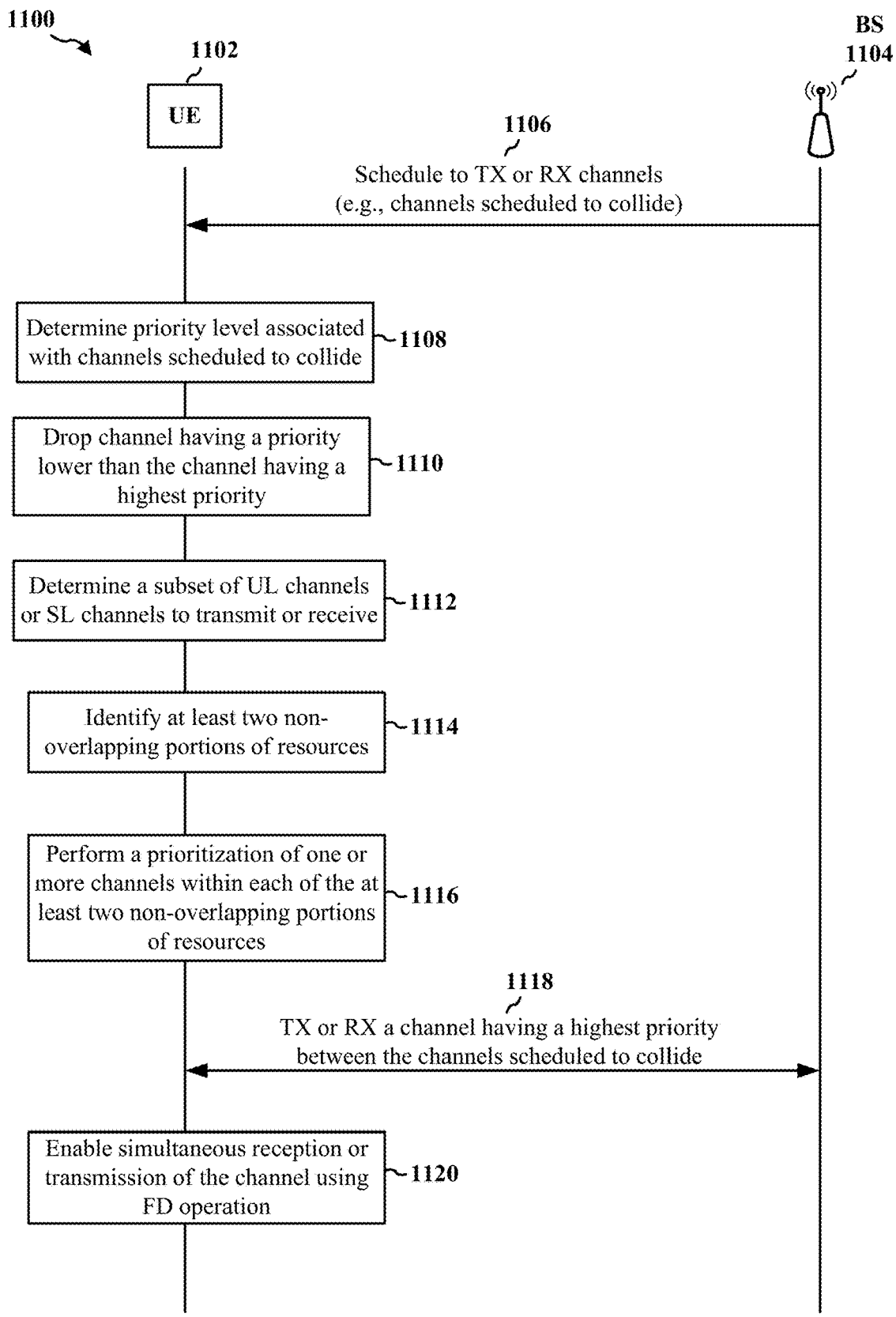
FIG. 11 is a call flow diagram of signaling between a UE and a base station.

FIG. 11 is a call flow diagram 1100 of signaling between a UE 1102 and a base station 1104. The base station 1104 may be configured to provide at least one cell. The UE 1102 may be configured to communicate with the base station 1104. For example, in the context of FIG. 1, the base station 1104 may correspond to base station 102/180 and, accordingly, the cell may include a geographic coverage area 110 in which communication coverage is provided and/or small cell 102' having a coverage area 110'. Further, a UE 1102 may correspond to at least UE 104. In another example, in the context of FIG. 3, the base station 1104 may correspond to base station 310 and the UE 1102 may correspond to UE 350.

As illustrated at 1106, the base station 1104 may transmit a schedule for a UE to transmit or receive channels. The base station may transmit the schedule to the UE 1102. The UE 1102 may receive the schedule to transmit or receive channels from the base station 1104. At least two channels may be scheduled to collide with each other. In some aspects, the channels that are scheduled to collide with each other may comprise overlapping time resources. In some aspects, the at least two channels that are scheduled to collide with each other may comprise at least one UL channel and at least one SL transmission channel.

As illustrated at 1108, the UE 1102 may determine a priority level associated with channels that are scheduled to collide with each other. In some aspects, the channels that are scheduled to collide with each other may comprise overlapping time resources.

As illustrated at 1110, the UE 1102 may drop a channel having a priority lower than the channel having the highest priority. The UE may drop the channel having a priority lower than the channel having the highest priority between the channels that are scheduled to collide with each other.

As illustrated at 1112, the UE 1102 may determine a subset of UL channels or SL channels to transmit or receive. The channels that are scheduled to collide with each other may comprise at least one UL channel or at least one SL channel. In some aspects, any conflicts between UL channels of the subset of UL channels may be resolved to determine one or more UL channels that are configured for transmission by the UE. In some aspects, to determine the subset of UL channels or SL channels to transmit or receive, the UE may order all of the subset of UL channels. The UE may order all of the subset of UL channels based on a respective priority of each UL channel within the subset of UL channels. In some aspects, the subset of UL channels may be ordered from high to low priority. The UE may order all of the subset of SL channels. The UE may order all of the subset of SL channels based on a respective priority of each SL channel within the subset of SL channels. In some aspects, the subset of SL channels may be ordered from high to low priority. The UE may generate a set of channels S of channels from the subset of UL and the subset of SL channels. The UE may generate the set of channels S of channels from the subset of UL and the subset of SL channels that meet requirements for transmission or reception. In some aspects, if a channel from the subset of UL channels or the subset of SL channels conflicts with any of the channels within the set of channels S, then the channel may be dropped. In some aspects, if a channel from the subset of UL channels or the subset of SL channels does not conflict with any of the channels within the set of channels S, then the channel may be added to the set of channels S. In some aspects, if a channel from the subset of UL channels or the subset of SL channels is a transmission channel, a power of the channel may be set to not exceed a power threshold in order to limit interference to any receiving channels within the set of channels S.

As illustrated at 1114, the UE 1102 may identify at least two non-overlapping portions of resources within an allocation of resources. In some aspects, a frequency gap may be between each of the at least two non-overlapping portions of resources.

As illustrated at 1116, the UE 1102 may perform a prioritization of one or more channels within each of the at least two non-overlapping portions of resources. A communication direction of each of the at least two non-overlapping portions of resources may be based on a channel of the one or more channels having a highest priority. In some aspects, the communication direction of each of the at least two non-overlapping portions of resources may be fixed. For example, the communication direction of a first portion may be fixed to transmit, while the communication direction of a second portion may be fixed to receive. In some aspects, the communication direction of the non-overlapping portions may be the same or different. A prioritization procedure for each of the at least two non-overlapping portions of resources may determine channels for transmission or reception within each of the at least two non-overlapping portions of resources. In some aspects, the at least two non-overlapping portions of resources may be configured to drop any channels having a communication direction that conflicts with the channel having the highest priority. In some aspects, the communication direction of at least one of the at least two non-overlapping portions may be pre-assigned. For example, the communication direction of at least one of the at least two non-overlapping portions may be pre-assigned by the UE regardless of the communication directions of channels that may be scheduled in the portion.

As illustrated at 1118, the UE 1102 may transmit or receive a channel having a highest priority between the channels that are scheduled to collide with each other. In some aspects, the UE 1102 may transmit the channel having the highest priority between the channels that are scheduled to collide with each other to the base station 1104. The base station 1104 may receive the channel from the UE 1102. In some aspects, the base station 1104 may transmit the channel having the highest priority between the channels that are scheduled to collide with each other to the UE 1102. The UE 1102 may receive the channel from the base station 1104. The channel that is transmitted or received may comprise at least one of an UL transmission, a DL reception, an SL transmission, or an SL reception.

As illustrated at 1120, the UE 1102 may enable simultaneous reception or transmission of the channel using a full duplex operation. The UE may enable simultaneous reception or transmission of the channel using the full duplex operation based on at least one condition. In some aspects, the at least one condition may comprise that the simultaneous reception or transmission occur on different RBs from the RBs used by the transmission or the reception of the channel having the highest priority. In some aspects, the at least one condition may comprise whether a reception portion and a transmission portion of the simultaneous reception or transmission are separated by a frequency gap. The frequency gap may be a configurable value or may be preconfigured. In some aspects, a size of the frequency gap may be based on a bandwidth of a transmission. In some aspects, the at least one condition may comprise that a number of transmission and reception switches do not exceed a threshold value. In some aspects, the at least one condition may comprise that the UE transmits at most one channel. In some aspects, the at least one condition may comprise a timing difference between simultaneous transmissions, simultaneous receptions, or simultaneous transmission and reception. The timing difference between the simultaneous transmissions, the simultaneous receptions, or the simultaneous transmission and reception may not exceed a timing difference value. In some aspects, the at least one condition may comprise that a transmission power spectral density (PSD) does not exceed a PSD threshold.

Figure 12:
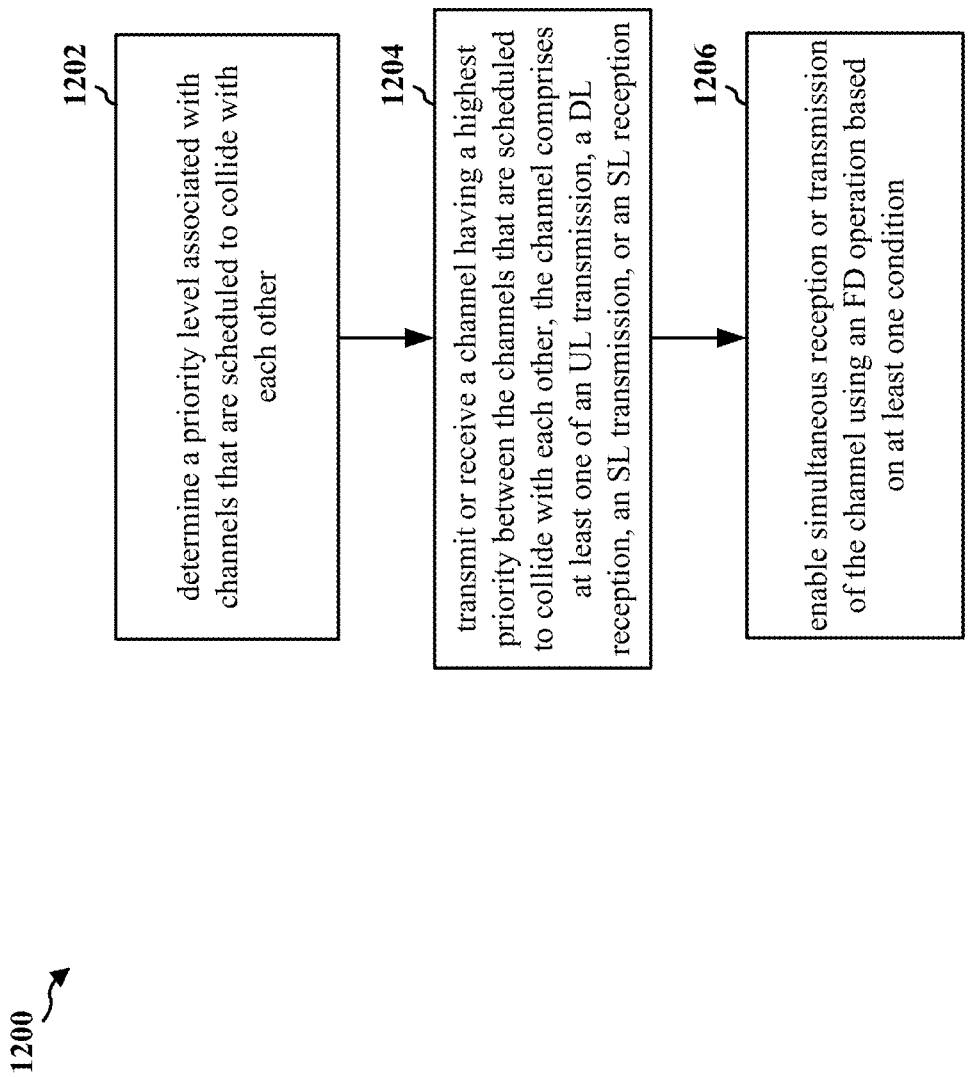
FIG. 12 is a flowchart of a method of wireless communication.

FIG. 12 is a flowchart 1200 of a method of wireless communication. The method may be performed by a UE or a component of a UE (e.g., the UE 104; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow the UE to perform a prioritization procedure to determine to transmit or receive uplink or sidelink signals.

At 1202, the UE may determine a priority level associated with channels that are scheduled to collide with each other. For example, 1202 may be performed by determination component 1440 of apparatus 1402. In some aspects, the channels that are scheduled to collide with each other may comprise overlapping time resources.

At 1204, the UE may transmit or receive a channel having a highest priority between the channels that are scheduled to collide with each other. For example, 1204 may be performed by priority component 1450 of apparatus 1402. The channel that is transmitted or received may comprise at least one of an UL transmission, a DL reception, an SL transmission, or an SL reception.

At 1206, the UE may enable simultaneous reception or transmission of the channel using a full duplex operation. For example, 1206 may be performed by full duplex component 1452 of apparatus 1402. The UE may enable simultaneous reception or transmission of the channel using the full duplex operation based on at least one condition. In some aspects, the at least one condition may comprise that the simultaneous reception or transmission occur on different RBs from the RBs used by the transmission or the reception of the channel having the highest priority. In some aspects, the at least one condition may comprise whether a reception portion and a transmission portion of the simultaneous reception or transmission are separated by a frequency gap. The frequency gap may be a configurable value or may be preconfigured. In some aspects, a size of the frequency gap may be based on a bandwidth of a transmission. In some aspects, the at least one condition may comprise that a number of transmission and reception switches do not exceed a threshold value. In some aspects, the at least one condition may comprise that the UE transmits at most one channel. In some aspects, the at least one condition may comprise a timing difference between simultaneous transmissions, simultaneous receptions, or simultaneous transmission and reception. The timing difference between the simultaneous transmissions, the simultaneous receptions, or the simultaneous transmission and reception may not exceed a timing difference value. In some aspects, the at least one condition may comprise that a transmission power spectral density (PSD) does not exceed a PSD threshold.

Figure 13:
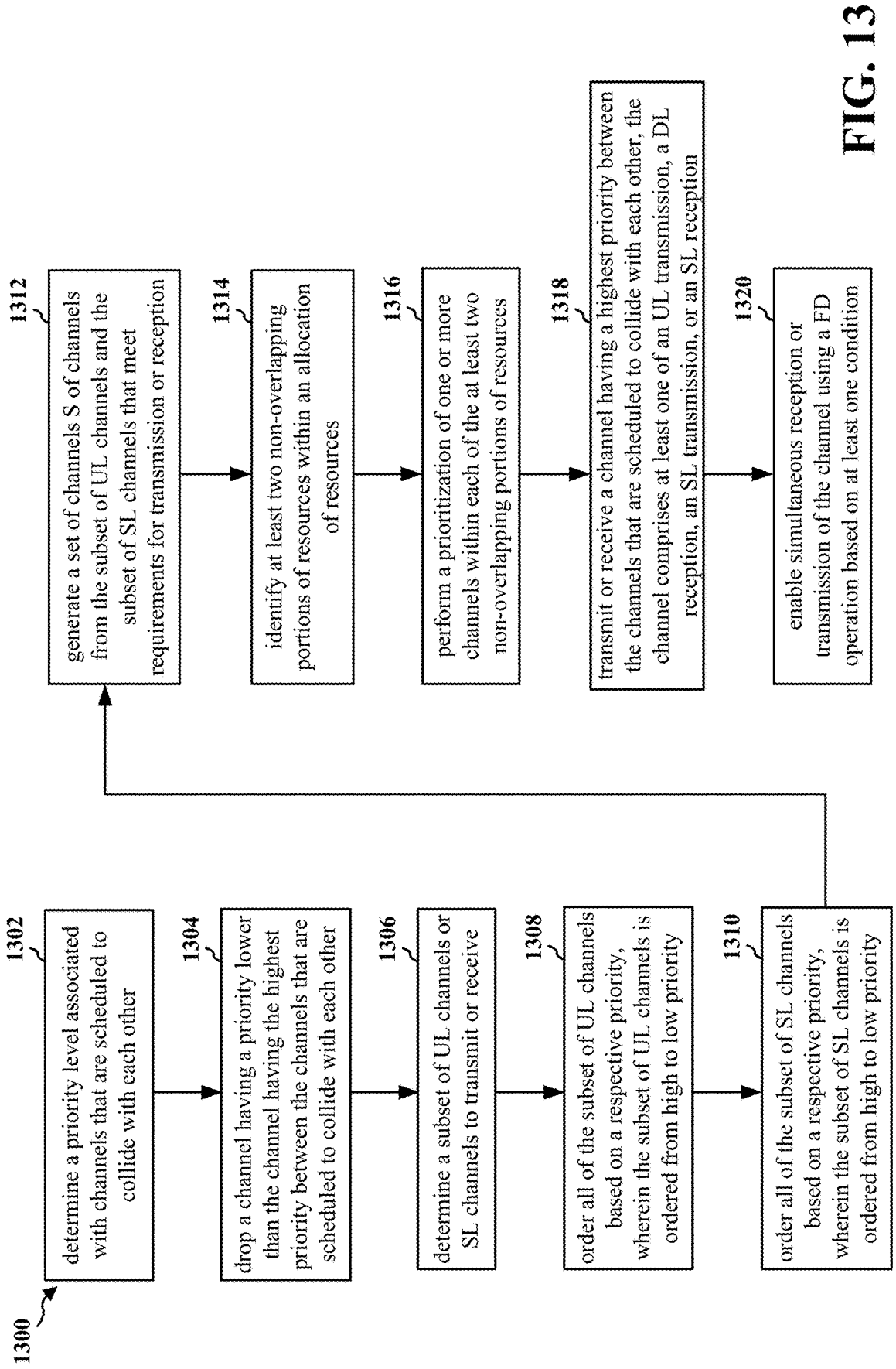
FIG. 13 is a flowchart of a method of wireless communication.

FIG. 13 is a flowchart 1300 of a method of wireless communication. The method may be performed by a UE or a component of a UE (e.g., the UE 104; the apparatus 1402; the cellular baseband processor 1404, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow the UE to perform a prioritization procedure to determine to transmit or receive uplink or sidelink signals.

At 1302, the UE may determine a priority level associated with channels that are scheduled to collide with each other. For example, 1302 may be performed by determination component 1440 of apparatus 1402. In some aspects, the channels that are scheduled to collide with each other may comprise overlapping time resources.

At 1304, the UE may drop a channel having a priority lower than the channel having the highest priority. For example, 1304 may be performed by drop component 1442 of apparatus 1402. The UE may drop the channel having a priority lower than the channel having the highest priority between the channels that are scheduled to collide with each other.

At 1306, the UE may determine a subset of UL channels or SL channels to transmit or receive. For example, 1306 may be performed by determination component 1440 of apparatus 1402. The channels that are scheduled to collide with each other may comprise at least one UL channel or at least one SL channel. In some aspects, any conflicts between UL channels of the subset of UL channels may be resolved to determine one or more UL channels that are configured for transmission by the UE.

At 1308, the UE may order all of the subset of UL channels. For example, 1308 may be performed by order component 1444 of apparatus 1402. The UE may order all of the subset of UL channels based on a respective priority of each UL channel within the subset of UL channels. In some aspects, the subset of UL channels may be ordered from high to low priority.

At 1310, the UE may order all of the subset of SL channels. For example, 1310 may be performed by order component 1444 of apparatus 1402. The UE may order all of the subset of SL channels based on a respective priority of each SL channel within the subset of SL channels. In some aspects, the subset of SL channels may be ordered from high to low priority.

At 1312, the UE may generate a set of channels S of channels from the subset of UL and the subset of SL channels. For example, 1312 may be performed by set component 1446 of apparatus 1402. The UE may generate the set of channels S of channels from the subset of UL and the subset of SL channels that meet requirements for transmission or reception. In some aspects, if a channel from the subset of UL channels or the subset of SL channels conflicts with any of the channels within the set of channels S, then the channel may be dropped. In some aspects, if a channel from the subset of UL channels or the subset of SL channels does not conflict with any of the channels within the set of channels S, then the channel may be added to the set of channels S. In some aspects, if a channel from the subset of UL channels or the subset of SL channels is a transmission channel, a power of the channel may be set to not exceed a power threshold in order to limit interference to any receiving channels within the set of channels S.

At 1314, the UE may identify at least two non-overlapping portions of resources within an allocation of resources. For example, 1314 may be performed by identify component 1448 of apparatus 1402. In some aspects, a frequency gap may be between each of the at least two non-overlapping portions of resources.

At 1316, the UE may perform a prioritization of one or more channels within each of the at least two non-overlapping portions of resources. For example, 1316 may be performed by priority component 1450 of apparatus 1402. A communication direction of each of the at least two non-overlapping portions of resources may be based on a channel of the one or more channels having a highest priority. In some aspects, the communication direction of each of the at least two non-overlapping portions of resources may be fixed. For example, the communication direction of a first portion may be fixed to transmit, while the communication direction of a second portion may be fixed to receive. In some aspects, the communication direction of the non-overlapping portions may be the same or different. A prioritization procedure for each of the at least two non-overlapping portions of resources may determine channels for transmission or reception within each of the at least two non-overlapping portions of resources. In some aspects, the at least two non-overlapping portions of resources may be configured to drop any channels having a communication direction that conflicts with the channel having the highest priority. In some aspects, the communication direction of at least one of the at least two non-overlapping portions may be pre-assigned. For example, the communication direction of at least one of the at least two non-overlapping portions may be pre-assigned by the UE regardless of the communication directions of channels that may be scheduled in the portion.

At 1318, the UE may transmit or receive a channel having a highest priority between the channels that are scheduled to collide with each other. For example, 1318 may be performed by priority component 1450 of apparatus 1402. The channel that is transmitted or received may comprise at least one of an UL transmission, a DL reception, an SL transmission, or an SL reception.

At 1320, the UE may enable simultaneous reception or transmission of the channel using a full duplex operation. For example, 1320 may be performed by full duplex component 1452 of apparatus 1402. The UE may enable simultaneous reception or transmission of the channel using the full duplex operation based on at least one condition. In some aspects, the at least one condition may comprise that the simultaneous reception or transmission occur on different RBs from the RBs used by the transmission or the reception of the channel having the highest priority. In some aspects, the at least one condition may comprise whether a reception portion and a transmission portion of the simultaneous reception or transmission are separated by a frequency gap. The frequency gap may be a configurable value or may be preconfigured. In some aspects, a size of the frequency gap may be based on a bandwidth of a transmission. In some aspects, the at least one condition may comprise that a number of transmission and reception switches do not exceed a threshold value. In some aspects, the at least one condition may comprise that the UE transmits at most one channel. In some aspects, the at least one condition may comprise a timing difference between simultaneous transmissions, simultaneous receptions, or simultaneous transmission and reception. The timing difference between the simultaneous transmissions, the simultaneous receptions, or the simultaneous transmission and reception may not exceed a timing difference value. In some aspects, the at least one condition may comprise that a transmission power spectral density (PSD) does not exceed a PSD threshold.

Figure 14:
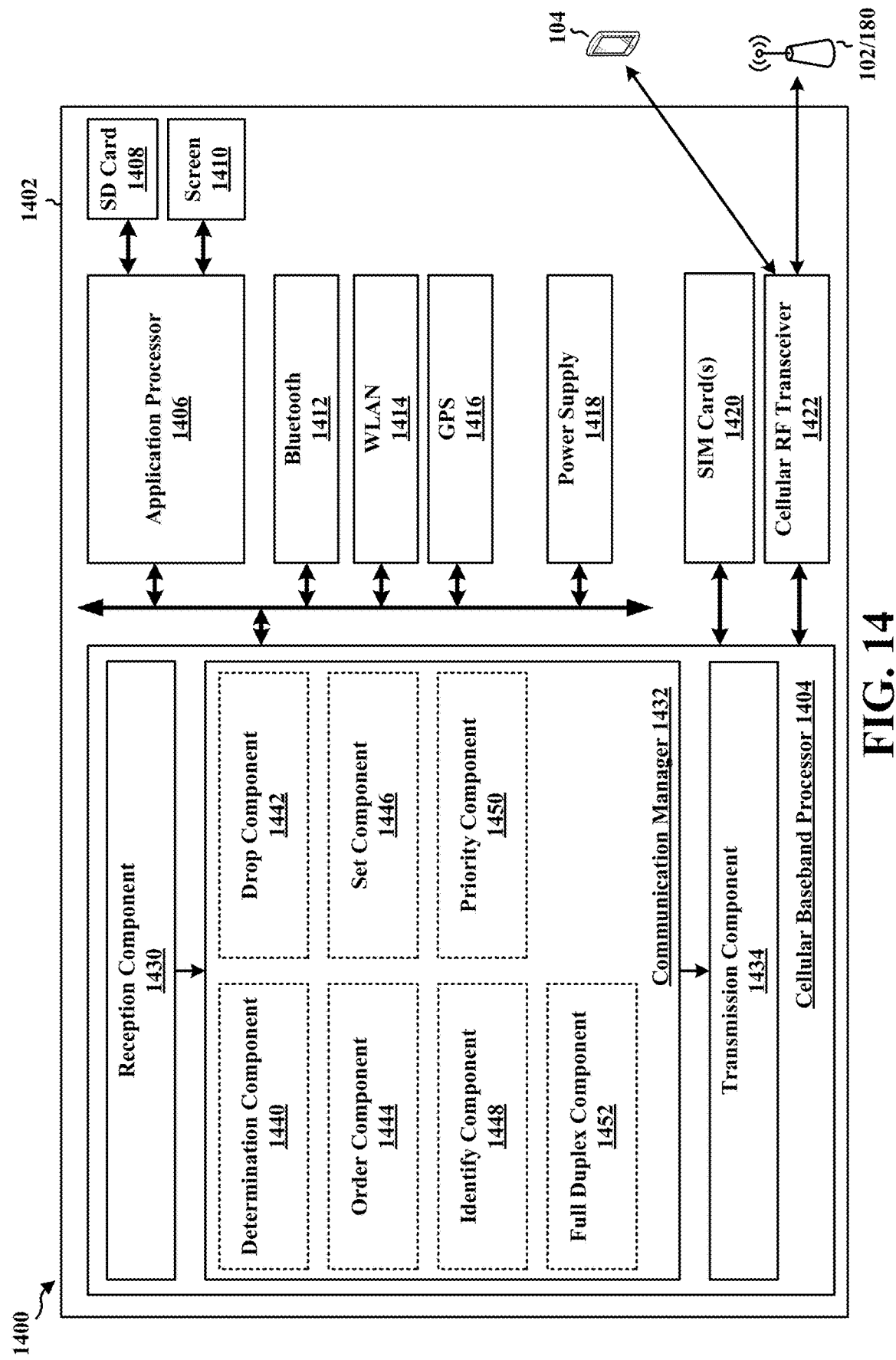
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a cellular baseband processor 1404 (also referred to as a modem) coupled to a cellular RF transceiver 1422. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a determination component 1440 that is configured to determine a priority level associated with channels that are scheduled to collide with each other, e.g., as described in connection with 1202 of FIG. 12 or 1302 of FIG. 13. The determination component 1440 may be configured to determine a subset of UL channels or SL channels to transmit or receive, e.g., as described in connection with 1306 of FIG. 13. The communication manager 1432 further includes a drop component 1442 that is configured to drop a channel having a priority lower than the channel having the highest priority, e.g., as described in connection with 1304 of FIG. 13. The communication manager 1432 further includes an order component 1444 that is configured to order all of the subset of UL channels, e.g., as described in connection with 1308 of FIG. 13. The order component 1444 may be configured to order all of the subset of SL channels, e.g., as described in connection with 1310 of FIG. 13. The communication manager 1432 further includes a set component 1446 that is configured to generate a set of channels S of channels from the subset of UL and the subset of SL channels, e.g., as described in connection with 1312 of FIG. 13. The communication manager 1432 further includes an identify component 1448 that is configured to identify at least two non-overlapping portions of resources within an allocation of resources, e.g., as described in connection with 1314 of FIG. 13. The communication manager 1432 further includes a priority component 1450 that is configured to perform a prioritization of one or more channels within each of the at least two non-overlapping portions of resources, e.g., as described in connection with 1316 of FIG. 13. The priority component 1450 may be configured to transmit or receive a channel having a highest priority between the channels that are scheduled to collide with each other, e.g., as described in connection with 1204 of FIG. 12 or 1318 of FIG. 13. The communication manager 1432 further includes a full duplex component 1452 that is configured to enable simultaneous reception or transmission of the channel using a full duplex operation, e.g., as described in connection with 1206 of FIG. 12 or 1320 of FIG. 13.

The apparatus may include additional components that perform each of the blocks of the algorithm in the flowcharts of FIG. 12 or 13. As such, each block in the flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the cellular baseband processor 1404, includes means for determining a priority level associated with channels that are scheduled to collide with each other. The apparatus includes means for transmitting or receiving a channel having a highest priority between the channels that are scheduled to collide with each other. The channel comprises at least one of an UL transmission, a DL reception, an SL transmission, or an SL reception. The apparatus includes means for enabling simultaneous reception or transmission of the channel using a full duplex operation based on at least one condition. The apparatus further includes means for dropping a channel having a priority lower than the channel having the highest priority between the channels that are scheduled to collide with each other. The apparatus further includes means for determining a subset of UL channels or SL channels to transmit or receive. The apparatus further includes means for ordering all of the subset of UL channels based on a respective priority. The subset of UL channels is ordered from high to low priority. The apparatus further includes means for ordering all of the subset of SL channels based on a respective priority. The subset of SL channels is ordered from high to low priority. The apparatus further includes means for generating a set of channels S of channels from the subset of UL channels and the subset of SL channels that meet requirements for transmission or reception. The apparatus further includes means for identifying at least two non-overlapping portions of resources within an allocation of resources. The apparatus further includes means for performing a prioritization of one or more channels within each of the at least two non-overlapping portions of resources. A communication direction of each of the at least two non-overlapping portions of resources is based on a channel of the one or more channels having a highest priority. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
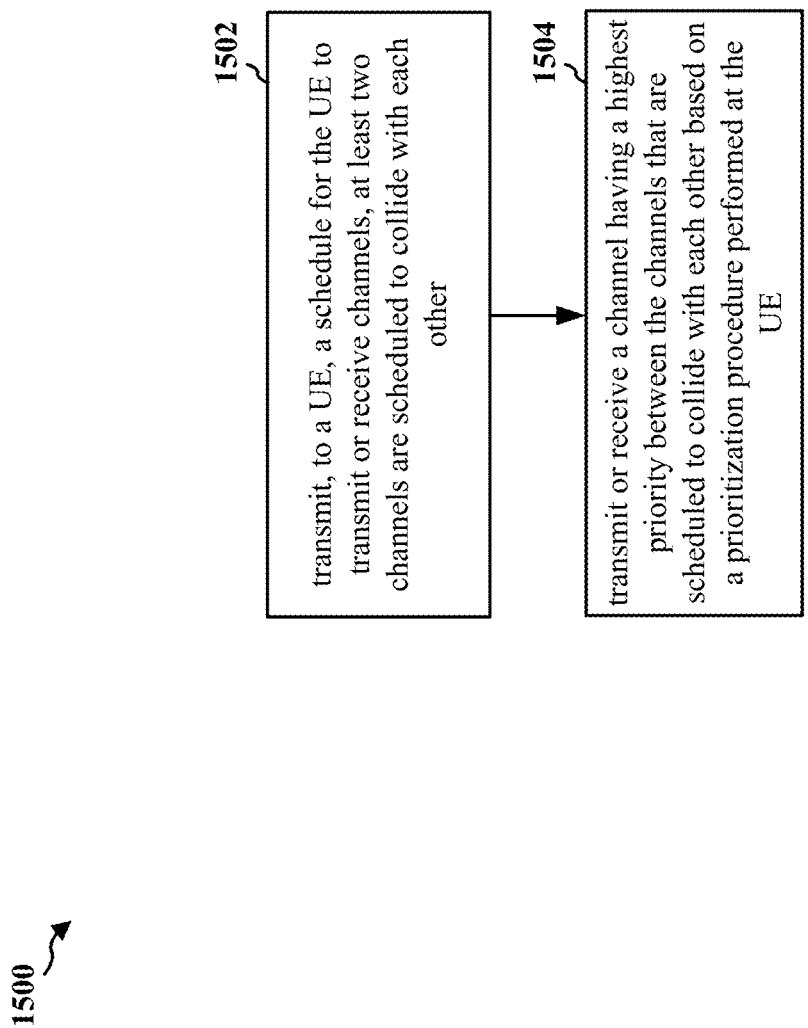
FIG. 15 is a flowchart of a method of wireless communication.

FIG. 15 is a flowchart 1500 of a method of wireless communication. The method may be performed by a base station or a component of a base station (e.g., the base station 102/180, 1104; the apparatus 1602; the baseband unit 1604, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to receive an uplink signal from a UE based on a prioritization procedure performed at the UE.

At 1502, the base station may transmit a schedule for a UE to transmit or receive channels. For example, 1502 may be performed by schedule component 1640 of apparatus 1602. The base station may transmit the schedule to a UE. At least two channels may be scheduled to collide with each other. In some aspects, the channels that are scheduled to collide with each other may comprise overlapping time resources. In some aspects, the at least two channels that are scheduled to collide with each other may comprise at least one UL channel and at least one SL transmission channel.

At 1504, the base station may transmit or receive a channel having a highest priority between the channels that are scheduled to collide with each other. For example, 1504 may be performed by priority component 1642 of apparatus 1602. The base station may transmit or receive the channel having the highest priority between the channels that are scheduled to collide with each other based on a prioritization procedure performed at the UE. In some aspects, the transmitting of the channel may comprise transmitting the channel in at least one fixed transmission partition. In some aspects, the receiving of the channel may comprise receiving the channel in at least one fixed reception partition.

Figure 16:
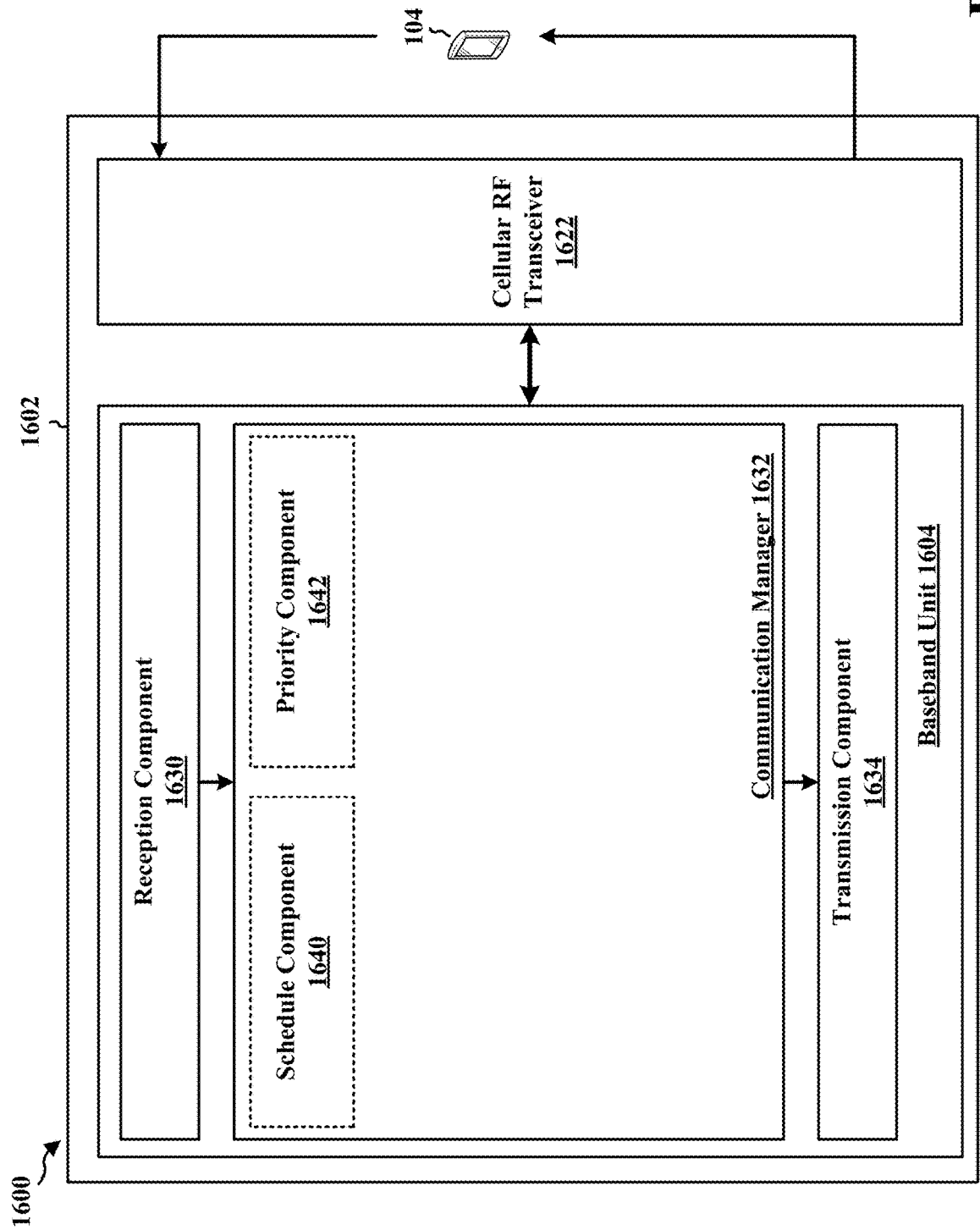
FIG. 16 is a diagram illustrating an example of a hardware implementation for an example apparatus.

FIG. 16 is a diagram 1600 illustrating an example of a hardware implementation for an apparatus 1602. The apparatus 1602 may be a base station, a component of a base station, or may implement base station functionality. In some aspects, the apparatus 1602 may include a baseband unit 1604. The baseband unit 1604 may communicate through a cellular RF transceiver 1622 with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a schedule component 1640 that may transmit a schedule for a UE to transmit or receive channels, e.g., as described in connection with 1502 of FIG. 15. The communication manager 1632 further includes a priority component 1642 that may transmit or receive a channel having a highest priority between the channels that are scheduled to collide with each other, e.g., as described in connection with 1504 of FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for transmitting, to a UE, a schedule for the UE to transmit or receive channels. At least two channels are scheduled to collide with each other. The apparatus includes means for transmitting or receiving a channel having a highest priority between the channels that are scheduled to collide with each other based on a prioritization procedure performed at the UE. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to determine a priority level associated with channels that are scheduled to collide with each other; transmit or receive a channel having a highest priority between the channels that are scheduled to collide with each other, wherein the channel comprises at least one of an UL transmission, a DL reception, a SL transmission, or an SL reception; and enable simultaneous reception or transmission of the channel using a FD operation based on at least one condition.

Aspect 2 is the apparatus of aspect 1, further includes a transceiver coupled to the at least one processor.

Aspect 3 is the apparatus of any of aspects 1 and 2, further includes that the at least one processor is further configured to drop a channel having a priority lower than the channel having the highest priority between the channels that are scheduled to collide with each other.

Aspect 4 is the apparatus of any of aspects 1-3, further includes that the channels that are scheduled to collide with each other comprise overlapping time resources.

Aspect 5 is the apparatus of any of aspects 1-4, further includes that the at least one condition comprises that the simultaneous reception or transmission occur on different RBs from the RBs used by transmission or reception of a channel having the highest priority.

Aspect 6 is the apparatus of any of aspects 1-5, further includes that the at least one condition comprises whether a reception portion and a transmission portion of the simultaneous reception or transmission are separated by a frequency gap.

Aspect 7 is the apparatus of any of aspects 1-6, further includes that the frequency gap is a configurable value or is preconfigured.

Aspect 8 is the apparatus of any of aspects 1-7, further includes that a size of the frequency gap is based on a bandwidth of a transmission.

Aspect 9 is the apparatus of any of aspects 1-8, further includes that the at least one condition comprises that a number of transmission and reception switches does not exceed a threshold value.

Aspect 10 is the apparatus of any of aspects 1-9, further includes that the at least one condition comprises that the UE transmits at most one channel.

Aspect 11 is the apparatus of any of aspects 1-10, further includes that the at least one condition comprises a timing difference between simultaneous transmissions, simultaneous receptions, or simultaneous transmission and reception.

Aspect 12 is the apparatus of any of aspects 1-11, further includes that the timing difference between the simultaneous transmissions, the simultaneous receptions, or the simultaneous transmission and reception does not exceed a timing difference value.

Aspect 13 is the apparatus of any of aspects 1-12, further includes that the at least one condition comprises that a transmission PSD does not exceed a PSD threshold.

Aspect 14 is the apparatus of any of aspects 1-13, further includes that the channels that are scheduled to collide with each other comprise at least one UL channel or at least one SL transmission channel, further includes that the at least one processor is further configured to determine a subset of UL channels or SL channels to transmit or receive.

Aspect 15 is the apparatus of any of aspects 1-14, further includes that any conflicts between UL channels of the subset of UL channels are resolved to determine one or more UL channels that are configured for transmission by the UE.

Aspect 16 is the apparatus of any of aspects 1-15, further includes that the at least one processor is further configured to order all of the subset of UL channels based on a respective priority, wherein the subset of UL channels is ordered from high to low priority; order all of the subset of SL channels based on a respective priority, wherein the subset of SL channels is ordered from high to low priority; and generate a set of channels S of channels from the subset of UL channels and the subset of SL channels that meet requirements for transmission or reception.

Aspect 17 is the apparatus of any of aspects 1-16, further includes that if a channel from the subset of UL channels or the subset of SL channels conflicts with any of the channels within the set of channels S, then the at least one processor is configured to drop the channel.

Aspect 18 is the apparatus of any of aspects 1-17, further includes that if a channel from the subset of UL channels or the subset of SL channels does not conflict with any of the channels within the set of channels S, then the at least one processor is configured to add the channel to the set of channels S.

Aspect 19 is the apparatus of any of aspects 1-18, further includes that if a channel from the subset of UL channels or the subset of SL channels is a transmission channel, the at least one processor is configured to set a power of the channel to not exceed a power threshold in order to limit interference to any receiving channels within the set of channels S.

Aspect 20 is the apparatus of any of aspects 1-19, further includes that the at least one processor is further configured to identify at least two non-overlapping portions of resources within an allocation of resources; and perform a prioritization of one or more channels within each of the at least two non-overlapping portions of resources, wherein a communication direction of each of the at least two non-overlapping portions of resources is based on a channel of the one or more channels having a highest priority.

Aspect 21 is the apparatus of any of aspects 1-20, further includes that the communication direction of each of the at least two non-overlapping portions of resources is fixed, wherein a prioritization procedure for each of the at least two non-overlapping portions of resources determine channels for transmission or reception within each of the at least two non-overlapping portions of resources.

Aspect 22 is the apparatus of any of aspects 1-21, further includes that a frequency gap is between each of the at least two non-overlapping portions of resources.

Aspect 23 is the apparatus of any of aspects 1-22, further includes that the at least one processor is configured to drop any channels within the at least two non-overlapping portions of resources having a communication direction that conflicts with the channel having the highest priority.

Aspect 24 is the apparatus of any of aspects 1-23, further includes that the communication direction of at least one of the at least two non-overlapping portions is pre-assigned.

Aspect 25 is a method of wireless communication for implementing any of aspects 1-24.

Aspect 26 is an apparatus for wireless communication including means for implementing any of aspects 1-24.

Aspect 27 is a computer-readable medium storing computer executable code, where the code when executed by a processor causes the processor to implement any of aspects 1-24.

Aspect 28 is an apparatus for wireless communication at a base station including at least one processor coupled to a memory and configured to transmit, to a UE, a schedule for the UE to transmit or receive channels, wherein at least two channels are scheduled to collide with each other; and transmit or receiving a channel having a highest priority between the channels that are scheduled to collide with each other based on a prioritization procedure performed at the UE.

Aspect 29 is the apparatus of aspect 28, further includes a transceiver coupled to the at least one processor.

Aspect 30 is the apparatus of any of aspects 28 and 29, further includes that the channels that are scheduled to collide with each other comprise overlapping time resources, wherein the at least two channels that are scheduled to collide with each other comprise at least one UL channel and at least one SL transmission channel.

Aspect 31 is the apparatus of any of aspects 28-30, further includes that to transmit the channel the at least one processor is configured to transmit the channel in at least one fixed transmission partition, wherein to receive the channel the at least one processor is configured to receive the channel in at least one fixed reception partition.

Aspect 32 is a method of wireless communication for implementing any of aspects 28-31.

Aspect 33 is an apparatus for wireless communication including means for implementing any of aspects 28-31.

Aspect 34 is a computer-readable medium storing computer executable code, where the code when executed by a processor causes the processor to implement any of aspects 28-31.

What is claimed is:

1. An apparatus for wireless communication at a user equipment (UE), comprising:
    a memory; and
    at least one processor coupled to the memory and configured to:
        determine a priority level associated with channels that are scheduled to collide with each other;
        transmit or receive a first channel having a highest priority from the channels that are scheduled to collide with each other, wherein the first channel comprises at least one of an uplink (UL) transmission, a downlink (DL) reception, a sidelink (SL) transmission, or an SL reception; and
        enable simultaneous reception or transmission of the first channel using a full duplex (FD) operation based on at least one condition wherein the at least one condition comprises that a number of times the UE switches between transmission and reception in a frequency domain does not exceed a threshold value.

2. The apparatus of claim 1, further comprising a transceiver coupled to the at least one processor.

3. The apparatus of claim 1, wherein the at least one processor is further configured to:
    drop a channel having a priority lower than the channel having the highest priority between the channels that are scheduled to collide with each other.

4. The apparatus of claim 1, wherein the channels that are scheduled to collide with each other comprise overlapping time resources.

5. The apparatus of claim 1, wherein the at least one condition comprises that the simultaneous reception or transmission occur on different resource blocks (RBs) from the RBs used by transmission or reception of a channel having the highest priority.

6. The apparatus of claim 1, wherein the at least one condition comprises whether a reception portion and a transmission portion of the simultaneous reception or transmission are separated by a frequency gap.

7. The apparatus of claim 6, wherein the frequency gap is a configurable value or is preconfigured.

8. The apparatus of claim 6, wherein a size of the frequency gap is based on a bandwidth of a transmission.

9. The apparatus of claim 1, wherein the at least one condition comprises that the UE transmits at most one channel.

10. The apparatus of claim 1, wherein the at least one condition comprises a timing difference between simultaneous transmissions, simultaneous receptions, or simultaneous transmission and reception.

11. The apparatus of claim 10, wherein the timing difference between the simultaneous transmissions, the simultaneous receptions, or the simultaneous transmission and reception does not exceed a timing difference value.

12. The apparatus of claim 1, wherein the at least one condition comprises that a transmission power spectral density (PSD) does not exceed a PSD threshold.

13. The apparatus of claim 1, wherein the channels that are scheduled to collide with each other comprise at least one UL channel or at least one SL transmission channel, wherein the at least one processor is further configured to:
    determine a subset of UL channels or SL channels to transmit or receive.

14. The apparatus of claim 13, wherein any conflicts between UL channels of the subset of UL channels are resolved to determine one or more UL channels that are configured for transmission by the UE.

15. The apparatus of claim 13, wherein the at least one processor is further configured to perform at least one of:
    order all of the subset of UL channels based on a respective priority, wherein the subset of UL channels is ordered from high to low priority;
    order all of the subset of SL channels based on a respective priority, wherein the subset of SL channels is ordered from high to low priority; or
    generate a set of channels S of channels from the subset of UL channels and the subset of SL channels that meet requirements for transmission or reception.

16. The apparatus of claim 15, wherein if a channel from the subset of UL channels or the subset of SL channels conflicts with any of the channels within the set of channels S, then the at least one processor is configured to drop the channel.

17. The apparatus of claim 15, wherein if a channel from the subset of UL channels or the subset of SL channels does not conflict with any of the channels within the set of channels S, then the at least one processor is configured to add the channel to the set of channels S.

18. The apparatus of claim 15, wherein if a channel from the subset of UL channels or the subset of SL channels is a transmission channel, the at least one processor is configured to set a power of the channel to not exceed a power threshold in order to limit interference to any receiving channels within the set of channels S.

19. The apparatus of claim 1, wherein the at least one processor is further configured to:
    identify at least two non-overlapping portions of resources within an allocation of resources; and
    perform a prioritization of one or more channels within each of the at least two non-overlapping portions of resources, wherein a communication direction of each of the at least two non-overlapping portions of resources is based on a second channel of the one or more channels having the highest priority from the at least two non-overlapping portions of resources, or the communication direction of each of the at least two non-overlapping portion of resources is fixed.

20. The apparatus of claim 19, wherein the communication direction of each of the at least two non-overlapping portions of resources is fixed, wherein the at least one processor is configured to perform a prioritization procedure for each of the at least two non-overlapping portions of resources to determine channels for transmission or reception within each of the at least two non-overlapping portions of resources.

21. The apparatus of claim 19, wherein a frequency gap is between each of the at least two non-overlapping portions of resources.

22. The apparatus of claim 19, wherein the communication direction of at least one of the at least two non-overlapping portions is pre-assigned.

23. The apparatus of claim 1, wherein the at least one processor is further configured to:
  drop any channels within at least two non-overlapping portions of resources having a communication direction that conflicts with a second channel from the at least two non-overlapping portions of resources having a highest priority.

24. A method of wireless communication at a user equipment (UE), comprising:
  determining a priority level associated with channels that are scheduled to collide with each other;
  transmitting or receiving a first channel having a highest priority from the channels that are scheduled to collide with each other, wherein the first channel comprises at least one of an uplink (UL) transmission, a downlink (DL) reception, a sidelink (SL) transmission, or an SL reception; and
  enabling simultaneous reception or transmission of the first channel using a full duplex (FD) operation based on at least one condition wherein the at least one condition comprises that a number of times the UE switches between transmission and reception in a frequency domain does not exceed a threshold value.

25. An apparatus for wireless communication at a base station, comprising:
  a memory; and
  at least one processor coupled to the memory and configured to:
    transmit, to a user equipment (UE), a schedule for the UE to transmit or receive channels, wherein at least two channels are scheduled to collide with each other, wherein any channels are dropped within at least two non-overlapping portions of resources having a communication direction that conflicts with a first channel from the at least two non-overlapping portion of resources having a highest priority; and
    transmit or receiving a second channel having a highest priority from the at least two channels that are scheduled to collide with each other based on a prioritization procedure performed at the UE and on a condition that comprises that a number of times the UE switches between transmission and reception in a frequency domain does not exceed a threshold value.

26. The apparatus of claim 25, further comprising a transceiver coupled to the at least one processor.

27. The apparatus of claim 25, wherein the at least two channels that are scheduled to collide with each other comprise overlapping time resources, wherein the at least two channels that are scheduled to collide with each other comprise at least one uplink (UL) channel and at least one sidelink (SL) transmission channel.

28. The apparatus of claim 25, wherein to transmit the second channel the at least one processor is configured to transmit the second channel in at least one fixed transmission partition, wherein to receive the channel the at least one processor is configured to receive the channel in at least one fixed reception partition.

29. A method of wireless communication at a base station, comprising:
  transmitting, to a user equipment (UE), a schedule for the UE to transmit or receive channels, wherein at least two channels are scheduled to collide with each other, wherein any channels are dropped within at least two non-overlapping portions of resources having a communication direction that conflicts with a first channel from the at least two non-overlapping portion of resources having a highest priority; and
  transmitting or receiving a second channel having a highest priority from the at least two channels that are scheduled to collide with each other based on a prioritization procedure performed at the UE and on a condition that comprises that a number of times the UE switches between transmission and reception in a frequency domain does not exceed a threshold value.

* * * * *